United States Patent
Backensto et al.

(10) Patent No.: US 10,019,327 B1
(45) Date of Patent: *Jul. 10, 2018

(54) SYSTEM AND METHOD FOR HYBRID KERNEL- AND USER-SPACE INCREMENTAL AND FULL CHECKPOINTING

(71) Applicant: OPEN INVENTION NETWORK LLC, Durham, NC (US)

(72) Inventors: Keith Richard Backensto, San Jose, CA (US); Allan Havemose, Arroyo Grande, CA (US)

(73) Assignee: Open Invention Network LLC, Durham, NC (US)

( * ) Notice: Subject to any disclaimer, the term of this patent is extended or adjusted under 35 U.S.C. 154(b) by 98 days.

This patent is subject to a terminal disclaimer.

(21) Appl. No.: 15/167,481

(22) Filed: May 27, 2016

Related U.S. Application Data

(63) Continuation of application No. 14/292,156, filed on May 30, 2014, now Pat. No. 9,354,977, which is a continuation-in-part of application No. 13/096,461, filed on Apr. 28, 2011, now Pat. No. 8,745,442.

(51) Int. Cl.
  *G06F 11/00* (2006.01)
  *G06F 11/14* (2006.01)

(52) U.S. Cl.
  CPC .... *G06F 11/1471* (2013.01); *G06F 2201/805* (2013.01); *G06F 2201/84* (2013.01)

(58) Field of Classification Search
  CPC ............. G06F 11/1407; G06F 11/1471; G06F 11/1448
  USPC ...................................................... 714/13, 15
  See application file for complete search history.

(56) References Cited

U.S. PATENT DOCUMENTS

| | | | | |
|---|---|---|---|---|
| 6,766,471 B2 * | 7/2004 | Meth | ................... | G06F 11/1469 714/15 |
| 7,657,787 B2 * | 2/2010 | Turner | ................ | G06F 11/1438 714/15 |
| 8,082,468 B1 * | 12/2011 | Backensto | .......... | G06F 11/1438 709/213 |
| 8,127,174 B1 * | 2/2012 | Shah | ................... | G06F 11/1438 714/13 |
| 8,352,933 B2 * | 1/2013 | Amann | ..................... | G06F 8/67 717/168 |
| 8,458,696 B2 * | 6/2013 | Park | ....................... | G06F 9/455 711/165 |

(Continued)

*Primary Examiner* — Joshua P Lottich

(57) ABSTRACT

A system includes a multi-process application that runs. A multi-process application runs on primary hosts and is checkpointed by a checkpointer comprised of at least one of a kernel-mode checkpointer module and one or more user-space interceptors providing at least one of barrier synchronization, checkpointing thread, resource flushing, and an application virtualization space. Checkpoints may be written to storage and the application restored from said stored checkpoint at a later time. Checkpointing may be incremental using Page Table Entry (PTE) pages and Virtual Memory Areas (VMA) information. Checkpointing is transparent to the application and requires no modification to the application, operating system, networking stack or libraries. In an alternate embodiment the kernel-mode checkpointer is built into the kernel.

20 Claims, 15 Drawing Sheets

(56) References Cited

U.S. PATENT DOCUMENTS

| | | | | |
|---|---|---|---|---|
| 8,549,532 B2* | 10/2013 | Ganesh | ................ | G06F 9/4856 |
| | | | | 711/162 |
| 2005/0257090 A1* | 11/2005 | Santos | ................ | G06F 11/1438 |
| | | | | 714/35 |
| 2007/0260920 A1* | 11/2007 | Turner | ................ | G06F 11/1438 |
| | | | | 714/17 |
| 2008/0077934 A1* | 3/2008 | Browning | ............... | G06F 9/524 |
| | | | | 718/107 |
| 2008/0141255 A1* | 6/2008 | Browning | ............... | G06F 9/524 |
| | | | | 718/102 |
| 2008/0183990 A1* | 7/2008 | Chen | .................. | G06F 11/1435 |
| | | | | 711/162 |
| 2008/0301101 A1* | 12/2008 | Baratto | ................ | G06F 9/4443 |
| 2010/0153674 A1* | 6/2010 | Park | .................... | G06F 9/45533 |
| | | | | 711/165 |
| 2010/0205604 A1* | 8/2010 | Brower | .................... | G06F 9/52 |
| | | | | 718/102 |
| 2011/0246617 A1* | 10/2011 | Sheehan | .................. | G06F 9/54 |
| | | | | 709/219 |

* cited by examiner

FIG.1 – Core Architecture

FIG.2 – Primary and Backup Pair

Fig.10 – Deployment scenarios

SYSTEM AND METHOD FOR HYBRID KERNEL- AND USER-SPACE INCREMENTAL AND FULL CHECKPOINTING

CROSS-REFERENCE TO RELATED APPLICATIONS

This application is a continuation of U.S. application Ser. No. 14/292,156 filed May 30, 2014 titled SYSTEM AND METHOD FOR HYBRID KERNEL- AND USER-SPACE INCREMENTAL AND FULL CHECKPOINTING, now issued U.S. Pat. No. 9,354,977, issued on May 31, 2016, which is a continuation-in part and claims priority from U.S. application Ser. No. 13/096,461 filed Jan. 31, 2011 titled SYSTEM AND METHOD FOR HYBRID KERNEL- AND USER-SPACE CHECKPOINTING, now issued U.S. Pat. No. 8,745,442, issued on Jun. 3, 2014, and is related to commonly assigned: U.S. patent application Ser. No. 13/920,889 filed Jun. 18, 2013 titled SYSTEM AND METHOD FOR HYBRID KERNEL- AND USER-SPACE CHECKPOINTING USING A CHARACTER DEVICE, now issued U.S. Pat. No. 9,164,843, issued on Oct. 20, 2015, and is related to U.S. patent application Ser. No. 12/334,660, filed Dec. 15, 2008, titled METHOD AND SYSTEM FOR PROVIDING CHECKPOINTING TO WINDOWS APPLICATION GROUPS, now issued U.S. Pat. No. 9,286,109, issued on Mar. 15, 2016, the disclosure of which is hereby incorporated by reference herein in its entirety. The present invention is also related to commonly assigned U.S. patent application Ser. No. 12/334,634 filed Dec. 15, 2008 titled METHOD AND SYSTEM FOR PROVIDING COORDINATED CHECKPOINTING TO A GROUP OF INDEPENDENT COMPUTER APPLICATIONS, now issued U.S. Pat. No. 8,078,910, issued on Dec. 13, 2011, the disclosure of which is hereby incorporated by reference herein in its entirety

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND OF THE INVENTION

1. Field of the Invention

This invention pertains to software-based checkpointing of applications running on computer systems, computer networks, telecommunications systems, embedded computer systems, wireless devices such as cell phones and PDAs, and more particularly to methods, systems and procedures (i.e., programming) for checkpointing and checkpoint-restoration of applications where the core checkpointing service is performed as a kernel service.

2. Description of Related Art

In many environments one of the most important features is to ensure that a running application continues to run even in the event of one or more system or software faults. Mission critical systems in telecommunications, military, financial and embedded applications must continue to provide their services even in the event of hardware or software faults. The autopilot on an airplane is designed to continue to operate even if some of the computer and instrumentation is damaged; the 911 emergency phone system is designed to operate even if the main phone system if severely damaged, and stock exchanges deploy software that keep the exchange running even if some of the routers and servers go down. Today, the same expectations of "fault-free" operations are being placed on commodity computer systems and standard applications.

Checkpointing is a general technique used to capture some or all of an application's state and preserve the state for use at a later time. The application state can, by way of example, be used to recovery a crashed application and to migrate, i.e. move, an application from one server to another.

TODO: The present invention builds on the teachings in U.S. patent application Ser. No. 13/096,461 wherein Havemose ("Havemose") teaches SYSTEM AND METHOD FOR HYBRID KERNEL- AND USER-SPACE CHECKPOINTING. The present invention further builds on the teachings in U.S. patent application Ser. No. 13/920,889 wherein Havemose ("Havemose") teaches SYSTEM AND METHOD FOR HYBRID KERNEL- AND USER-SPACE CHECKPOINTING USING A CHARACTER DEVICE. In these two patent applications Havemose teaches system and methods for checkpointing multi-process applications using a hybrid kernel-mode and user-mode checkpointer and the use of a character-device for checkpointing. In U.S. Pat. No. 7,293,200 Neary et al (Neary) disclose "Method and system for providing transparent incremental and multiprocess checkpoint to computer applications". In U.S. patent application Ser. No. 12/334,660 Backensto et al (Backensto) teach METHOD AND SYSTEM FOR PROVIDING CHECKPOINTING TO WINDOWS APPLICATION GROUPS providing similar checkpointing services to Windows applications, and in Ser. No. 12/334,634 Havemose (Havemose) teach METHOD AND SYSTEM FOR PROVIDING COORDINATED CHECKPOINTING TO A GROUP OF INDEPENDENT COMPUTER APPLICATIONS. Neary, Havemose and Backensto use a user-space checkpointer combined with interception and functionality to adjust links to libraries and files for checkpoint restore.

OpenVZ (http://en.wikipedia.org/wiki/OpenVZ) approaches checkpointing differently by providing checkpointing using a custom kernel. In other words, checkpointing is provided using a custom operating system.

Virtual Machine technology, such as VMware®, XEN®, and KVM, offer similar features, often using terminology such as snapshot and live migration. Virtual machine technology, however, is an entire additional software layer sitting under the operating system, which adds overhead and management complexity.

The prior art thus requires functionality running in user space (Neary, Havemose and Backensto), a custom operating system (OpenVZ), or a commitment to a hardware virtualization platform (VMware, XEN and KVM). Having a checkpointer with extensive user space components makes the checkpointer very dependent on system libraries and requires constant updating as user libraries change between releases of the operating system. Relying on a custom operating system requires application to be customized for the custom operating system, which can reduce the number of applications available to customers. Finally, a commitment to hardware/system virtualization can be expensive and change the deployment and management model of applications.

There is therefore a need for a checkpointing service that runs fully transparent to the applications, runs on standard operating systems, and operates without requiring a hardware virtualization layer. The present invention provides checkpointing as a kernel service generally loaded as a loadable kernel module working along with user-space interceptors. The kernel service may be dynamically loaded into the kernel and provides checkpointing services universally to all applications without requiring any application customizations or customization to the underlying operation system. Interceptors are loaded as part of loading the application. The kernel module checkpointer can be further optimized by modifying the kernel. Likewise, no hardware or system virtualization technology is required which keeps memory and hardware requirements minimal.

BRIEF SUMMARY OF THE INVENTION

The present invention provides systems and methods for application-checkpointing that requires no modification to the applications being checkpointed (i.e. is transparent) and works on commodity operating system and hardware. The terms "checkpointer", "checkpointing", "taking a checkpoint" and "checkpointing service" are utilized herein interchangeably to designate a set of services which capture the some or all state of an application and store all or some of the application state locally or remotely, and "restoring" or "checkpoint-restore" designates the process of restoring the state of the application from said stored application checkpoint. The terms "checkpoint file" or "checkpoint" are utilized herein interchangeably to designate the data captured by the checkpointing service. Generally, the checkpoint files are written to local storage, remote storage, network storage or memory. In the present invention, the elements of the checkpointing services are provided as a Loadable Kernel Module (LKM). Loadable kernel modules are also called Kernel Loadable Modules (KLM), kernel extensions, or simply Kernel Modules. Throughout the rest of this document we use the terms Loadable Kernel Module and kernel module interchangeably to designate the functionality across all operating systems.

When using checkpointing to move an application from one server (the primary) to another server (the backup) the following terminology is used:

The terms "primary" and "primary application" are used interchangeably to designate the primary application running on the primary host. The host on which the primary application is running is referred to as the "primary server", "primary host" or simply the "host" when the context is clear. The term "on the primary" is used to designate an operation or activity related to the primary application on the primary server.

Similarly, the terms "backup" and "backup application" are used interchangeably to designate a backup application running on a backup host. The host on which the backup application is running is referred to as a "backup server", a "backup host" or simply a "host" when the context is clear. The terms "on the backup" or "on a backup" are used interchangeably to designate an operation or activity related to a backup application on a backup server.

The term "Live Migration" is used to designate the processes of moving a running application or a running virtual machine from a primary server to a backup server. The "migration" is "live" as the application is kept running for the majority of the move. Generally, live migration of both applications and virtual machines are planned; i.e. they are triggered in response to an event. The event may be an operator choosing to migrate the application/VM, a memory threshold being met, or other pre-defined scriptable event. For the live migration to succeed both the primary and the backup must operate during the entire live migration process.

The term "fault" is used to designate an abnormal condition or defect of a component, software, sub-system or equipment. Examples of faults include a power supply burning out, a CPU overheating, and a software bug that crashes an application. Faults can happen at any time and are thus non-deterministic, i.e. unpredictable. The term "Fault Detection" designates the mechanism used to detect that a fault has occurred. Fault detection is well known in the art and is therefore not further defined herein.

The following terms are also used throughout the disclosures:

The terms "Windows®" and "Microsoft Windows®" are utilized herein interchangeably to designate any and all versions of the Microsoft Windows operating systems. By example, and not limitation, this includes Windows XP, Windows Server 2003, Windows Server 2008, Windows Server 2012 Windows NT, Windows Vista, Windows 7, Windows 8.x, Windows Mobile, Windows RT, and Windows Embedded. The operation and design of Microsoft Windows is well documented on the web at msdn.microsoft.com.

The terms "Linux" and "UNIX" are utilized herein to designate any and all variants of Linux and UNIX. By example, and not limitation, this includes RedHat Linux, Suse Linux, Ubuntu Linux, HPUX (HP UNIX), and Solaris (Sun UNIX). The design and operation of the Linux operating system is well documented on the web at www.kernel.org.

The terms "iOS" and "MacOS" are utilized herein to designate any and all variants of Apple's iOS devices and Macintosh operating systems. By example, and not limitation, this includes operating systems for iPhones, iPads, iPods, and the Macintosh product lines.

The terms "Android", "Android OS" and "Android Operating System" are utilized herein to designate any and all variant of Android on any type of device, whether a mobile phone, phone, tablet, desktop, cameras, embedded device, or other computing or computer device.

The term "node" and "host" are utilized herein interchangeably to designate one or more processors running a single instance of an operating system. A virtual machine, such as a VMware, KVM, Virtual Box®, or XEN VM instance, is also considered a "node". Using VM technology, it is possible to have multiple nodes on one physical server.

The terms "application" or as appropriate "multi process application" are utilized to designate a grouping of one or more processes, where each process can consist of one or more threads. Operating systems generally launch an application by creating the application's initial process and letting that initial process run/execute. In the following teachings we often identify the application at launch time with said initial process.

As an application is a grouping of one or more processes, an application may thus be comprised of one or more other applications, each of which in turn is comprised of one of more processes. This hierarchy of application may continue to any depth without loss of generality.

In the following we use commonly known terms including but not limited to "client", "server", "API", "java", "process", "process ID (PID)", "thread", "thread ID (TID)", "thread local storage (TLS)", "instruction pointer", "stack", "kernel", "kernel module", "loadable kernel module", "heap", "stack", "files", "disk", "CPU", "CPU registers", "storage", "memory", "memory segments", "address space", "semaphore", "loader", "system loader", "system path", "sockets", "TCP/IP", "http", "ftp", "Inter-process communication (IPC), "Asynchronous Procedure Calls (APC), "POSIX", "certificate", "certificate authority", "Secure Socket Layer", "SSL", MD-5", "MD-6", "Message Digest", "SHA", "Secure Hash Algorithm", "NSA", "NIST", "private key", "public key", "key pair", and "hash collision", and "signal". These terms are well known in the art and thus will not be described in detail herein.

The term "transport" is utilized to designate the connection, mechanism and/or protocols used for communicating across the distributed application. Examples of transport include TCP/IP, UDP, Message Passing Interface (MPI), Myrinet, Fibre Channel, ATM, shared memory, DMA, RDMA, system buses, and custom backplanes. In the following, the term "transport driver" is utilized to designate the implementation of the transport. By way of example, the transport driver for TCP/IP would be the local TCP/IP stack running on the host.

The term "interception" is used to designate the mechanism by which an application re-directs a system call or library call to a new implementation. On Linux and other UNIX variants interception may be achieved by a combination of LD_PRELOAD, wrapper functions, identically named functions resolved earlier in the load process, and changes to the kernel sys_call_table. On Windows, interception may be achieved by modifying a process' Import Address Table and creating Trampoline functions, as documented by "Detours: Binary Interception of Win32 Functions" by Galen Hunt and Doug Brubacher, Microsoft Research July 1999". Throughout the rest of this document the terminology interception to designate the functionality across all operating systems. The terminology pre-loading is used to designate the process of loading the interceptors into the application's address space on all operating systems.

The term "transparent" is used herein to designate that no modification to the application is required. In other words, the present invention works directly on the application binary without needing any application customization, source code modifications, recompilation, re-linking, special installation, custom agents, operating system changes, or other extensions.

The term "fork( )" is used to designate the operating system mechanism used to create a new running process. On Linux, Solaris, and other UNIX variants, a family of fork( ) calls is provided. On Windows, one of the equivalent calls is "CreateProcess( )". Throughout the rest of this document we use the term "fork" to designate the functionality across all operating systems, not just on Linux/Unix. In general fork( ) makes a copy of the process making the fork( ) call.

This means that the newly created process has a copy of the entire address space, including all variables, I/O etc of the parent process.

The term "exec( )" is used to designate the operating system mechanism used to overlay a new image on top of an already existing process. On Linux, Solaris, and other UNIX a family of exec( ) calls is provided. On Windows, the equivalent functionality is provided by e.g. "CreateProcess( )" via parameters. Throughout the rest of this document we use the term "exec" to designate the functionality across all operating systems, not just Linux/Unix. In general, exec( ) overwrites the entire address space of the process calling exec( ). A new process is not created and data, heap and stacks of the calling process are replaced by those of the new process. A few elements are preserved, including but not limited to process-ID, UID, open file descriptors and user-limits.

The terms "barrier" and "barrier synchronization" are used herein to designate a type of synchronization method. A barrier for a group of processes and threads is a point in the execution where all threads and processes must stop before being allowed to proceed. Barriers are typically implemented using semaphores, mutexes, locks, event objects, or other equivalent system functionality. Barriers are well known in the art and will not be described further here.

Modern operating systems such as Windows and Linux separate the address space into kernel space and user space. Kernel space is the address space reserved for running the kernel, kernel extensions, and depending on operating system, device drivers. User space is the address space in which user processes (i.e. applications) run.

To avoid simultaneous use of shared resources in multithreaded multi-process applications locking is used. Several techniques and software constructs exists to arbitrate access to resources. Examples include, but are not limited to, mutexes, semaphores, futexes, critical sections and monitors. All serve similar purposes and often vary little from one implementation and operating system to another. In the following, the term "Lock" is used to designate any and all such locking mechanism. Properly written multi-process and multi-threaded application use locking to arbitrate access to shared resources The context of the present invention is an application on the primary server (primary application or the primary) and zero, one or more backup servers (also called the backups). While any number of backup-servers is supported the disclosures generally describe the scenario with one backup. As is obvious to anyone skilled in the art this is done without loss of generality.

As part of loading an application for checkpointing the checkpointer kernel module is loaded if not already loaded. The checkpointer kernel module provides checkpointing services in coordination with and integrated with the operating system kernel and user-space interceptors. The checkpoints may be used to start the application again on the primary, migrate the application to a backup or recover from a fault. The backup and fault recovery use checkpoints taken by the checkpointer to restore the application to a prior state.

Another aspect of the present invention is a resource virtualization layer running as part of the interceptors.

A key element of the present invention is thus the use of kernel module to capture the state of a running application and save said application state to storage.

Another key aspect of the present invention is to use said stored application state to rebuild, also called restore, a copy of the application and let the application resume execution from said stored application state.

Another aspect of the present invention is that the checkpointing service is provided as a loadable kernel module, thus providing the checkpointing service to application as an extension of the operating system kernel without requiring any application customizations or customization of system libraries. Yet another aspect of the present invention is that the checkpointing service may be built into the kernel, thus also offering the checkpointing service to applications as a built-in operating system service.

A related aspect is that the present invention provides hybrid kernel-space and user-space application checkpointing, as the kernel module operates along with the user-space library to perform the checkpointing.

Yet another aspect of the present invention is during a restore from a checkpoint the checkpointer kernel module adjusts kernel state for the particular application based on the checkpoint.

Another aspect of the present invention is that the checkpointer kernel module can be unloaded to free up memory when the checkpointing services no longer are needed.

Yet another aspect of the present invention is to optimize checkpointing using virtual memory area (VMA) information and the associated page table entries (PTE), and to use said VMA/PTE to add incremental checkpointing.

Another aspect of the present invention is that the _PAGE_DIRTY bit is repurposed to track dirty pages for checkpointing.

A further aspect of the present invention is that it can be provided on commodity operating systems such as Linux and Windows, and on commodity hardware such as Intel®, AMD® (Advance Micro Devices), SPARC® (Scalable Processor Architecture), ARM® (Advance Risk Machines), and MIPS® (Microprocessor without Interlocked Pipeline Stages). The present invention thus works on commodity operating systems, commodity hardware with standard (off the shelf) software without needing any further modifications.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

DETAILED DESCRIPTION OF THE INVENTION

Referring more specifically to the drawings, for illustrative purposes the present invention will be disclosed in relation to FIG. 1 through FIG. 15 It will be appreciated that the system and apparatus of the invention may vary as to configuration and as to details of the constituent components, and that the method may vary as to the specific steps and sequence, without departing from the basic concepts as disclosed herein.

0. INTRODUCTION

The context in which this invention is disclosed is an application running on a primary server. Without affecting the general case of multiple primary applications, the following disclosures often depict and describe just one primary application. Multiple primary applications are handled in a similar manner.

Likewise, the disclosures generally describe applications with one or two processes; any number of processes is handled in a similar manner. Finally, the disclosures generally describe one or two threads per process; any number of threads is handled in a similar manner

1. OVERVIEW

Figure 1:
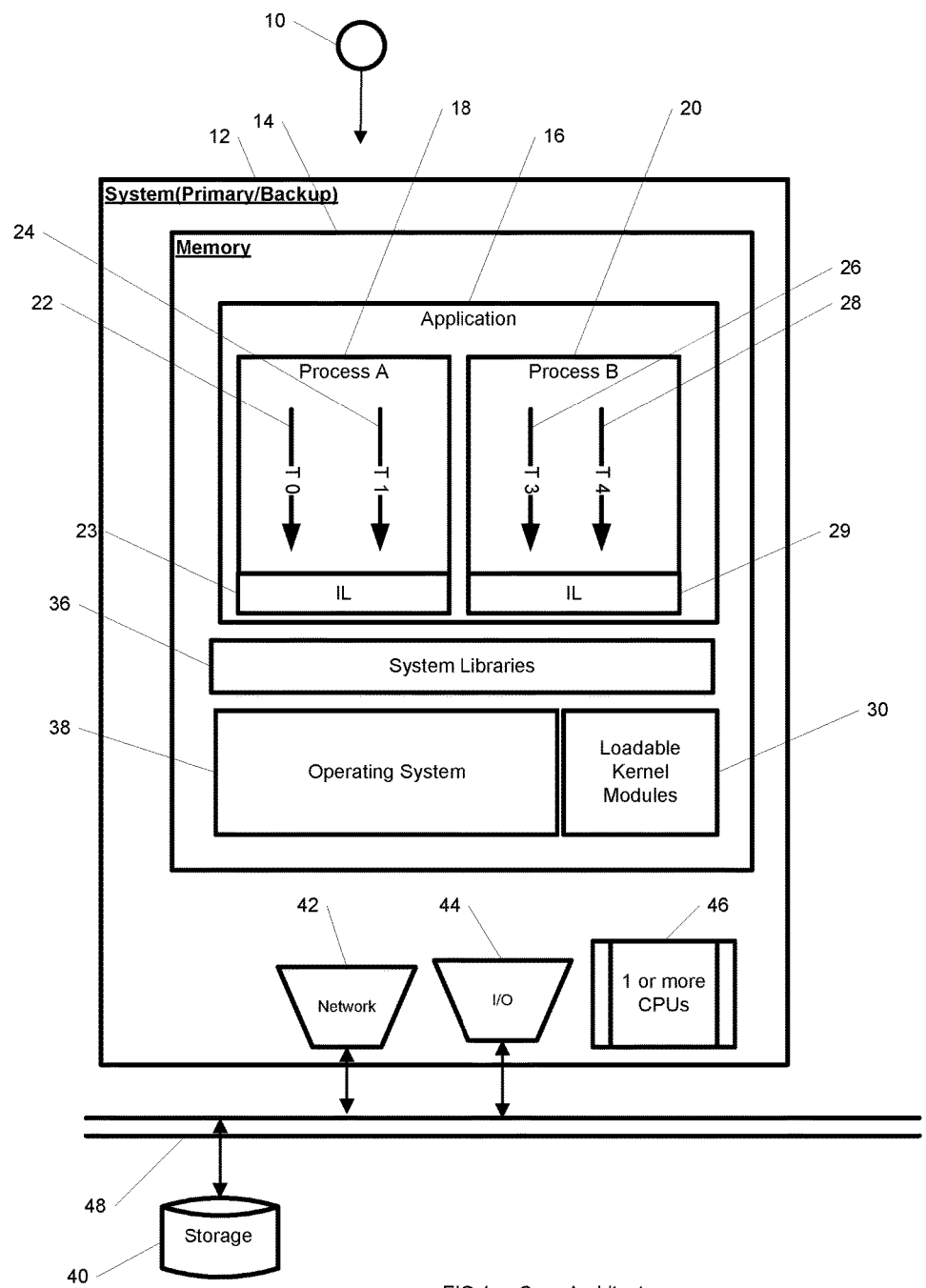
FIG. 1 is a block diagram of the core system architecture

FIG. 1 illustrates by way of example embodiment 10 the overall structure of the present invention. The following brief overview illustrates the high-level relationship between the various components; further details on the inner workings and interdependencies are provided in the following sections. FIG. 1 Illustrates by way of example embodiment 10 a primary server 12 with an application 16 loaded into system memory 14. The application 16 is comprised of two processes; process A 18 and process B 20. Each of the two processes has two running threads. Process A contains thread T0 22 and thread T1 24, while process B is contains thread T3 26 and thread T4 28. As part of loading the application 16 an interception layer (IL) 23, 29 is pre-loaded into the address space of each process. Interception Layer 23 for process A is preloaded into process As address space and Interception Layer 29 is preloaded into process B's address space. The system libraries 36 are generally interposed between the application 16 and operating system 38. Alongside with the operating system 38 are the loadable kernel modules 30.

System resources, such as CPUs 46, I/O devices 44, Network interfaces 42 and storage 40 are accessed using the operating system 38 and the loadable kernel modules 30. Devices accessing remote resources use some form of transport network 48. By way of example, system networking 42 may use TCP/IP over Ethernet transport, Storage 40 may use Fibre Channel or Ethernet transport, and I/O 44 may use USB.

The architecture for the backup is identical to the primary, In the preferred embodiment storage 40 is external and accessible by both primary and backups over a network 48.

FIG. 1 illustrates the system libraries 36 as separate from the application 16 and the individual processes process A 18 and process B 20. The system libraries are generally shared libraries. For clarity of presentation, the system libraries are depicted outside the address space of the individual processes, even though some library state and code is present within the address space of the individual application processes.

In an alternate embodiment the functionality of the kernel module 30 is built into, i.e. compiled into, the kernel. This eliminates the need to load the kernel module, at the expense of being a custom kernel. The preferred embodiment disclosed herein provides checkpointing services as a kernel module, but it is obvious to anyone with ordinary skills in the art the kernel module functionality could be compiled into the kernel as disclosed for the alternate embodiment.

Figure 2:
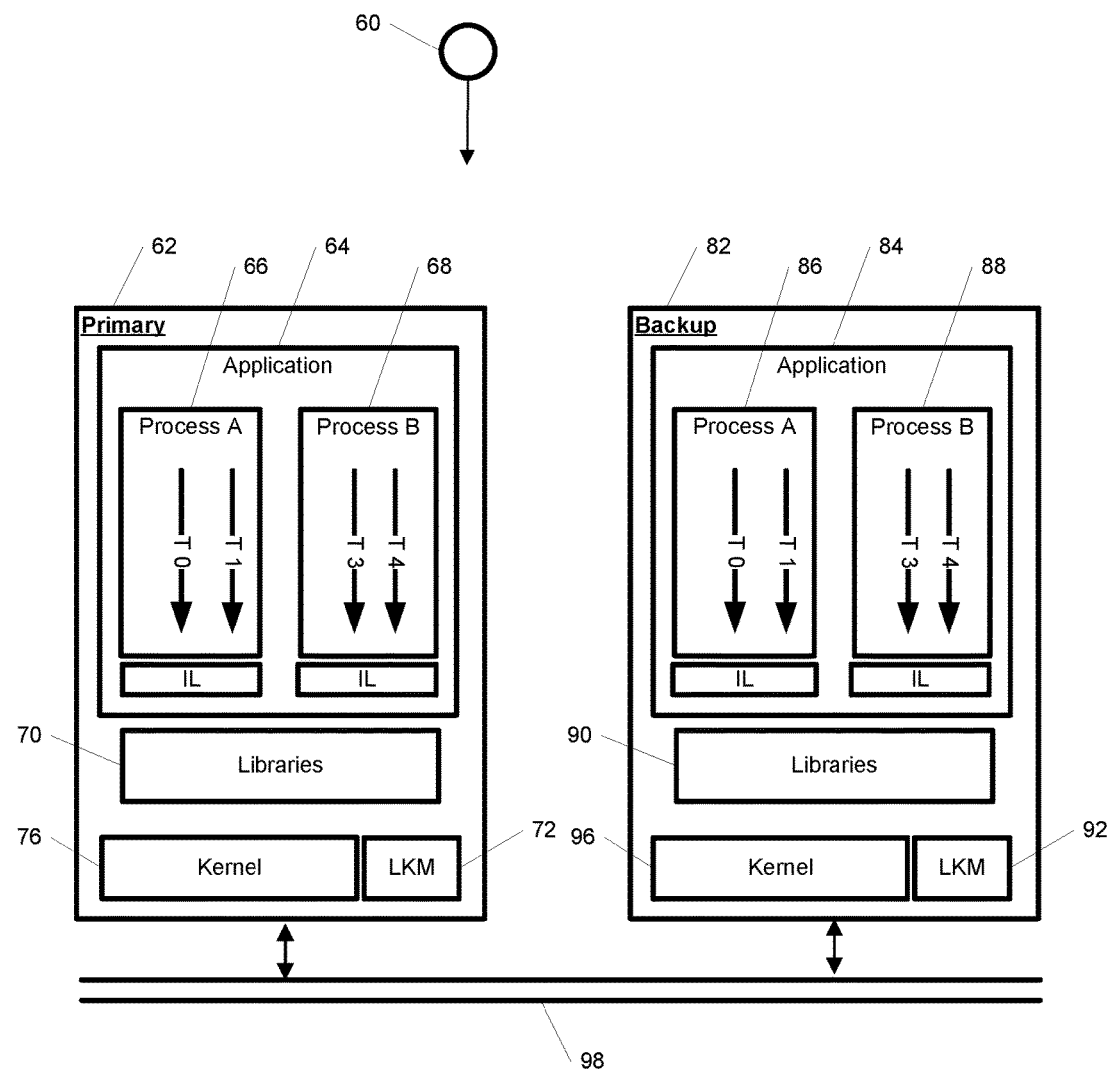
FIG. 2 is a block diagram illustrating a pair of primary and backup

FIG. 2 illustrates by way of example embodiment 60 a primary server 62 and its corresponding backup server 82 working as a pair of primary and backup. The primary application 64 is comprised of two processes; process A 66 and process B 68, each with two running threads and an interception layer. System libraries 70 on the primary are interposed between the application 64 and the operating system kernel 76. Loadable kernel modules 72 are loaded by the kernel 76 as needed.

Using a similar architecture, the backup server 82 contains the backup application 84 comprised of process A 86 and process B 88 each with two threads and interception layer. System libraries 90 are interposed between the application 84 and the operating system kernel 96. Loadable kernel modules 92 as loaded by the kernel 96 as needed.

Primary and backup communicate over one or more network connections 98.

2. KERNEL STRUCTURE

Linux and Windows are two dominant operating systems with different kernel architectures. Linux is build around a monolithic kernel with loadable kernel modules, while Windows is built around a micro kernel with a core executive. As with Linux, Windows supports loadable kernel modules and kernel-mode drivers. Both Windows and Linux thus enable drivers and modules to run in kernel space.

2.1 Memory

On the Linux operating system applications running in user space communicate with the kernel through defined kernel interfaces. The kernel interfaces are generally concealed by the system libraries as far as the applications in user space are concerned. On Windows, the Windows system libraries exemplified by the Win32 and Posix subsystems likewise manage the interfaces to kernel functionality. Generally, a user-space application doesn't need to concern itself with kernel behavior; it simply requests kernel services through the system libraries.

Both the Linux and Windows kernels and system libraries are well documented and only the elements relevant for the present invention will be further described.

On a 32-bit operating system an application can generally address the full 4 GB of memory corresponding to the 32 bits of address space, even if the underlying hardware provides less than 4 GB of memory. As a practical matter Linux reserves the upper 1 GB of memory for the operating system, while Windows generally reserves the upper 1 or 2 GB for the operating system. The available physical memory is first mapped into the address space of the kernel, and the kernel is then proving a flat virtual 4 GB address space for the application. For 64-bit operating systems and hardware similar considerations apply, other than the address space is 64 bits instead of 32 bit. The kernel maintains said mapping between application virtual addresses and physical memory addresses. The virtual address space of is broken into equal sized portions called pages by the kernel. Physical memory is likewise broken into similar sized pages, called page frames. On IA32 systems the page size is 4 kb (4096 bytes). Other architectures may have different page sizes. In the following PAGE_SIZE is used to designate the page size on all platforms. The present invention relies on this mapping to locate and extract application memory image as part of checkpointing while running within the context of the kernel. Generally, the address space when viewed from an application process's perspective is called process virtual memory or process address space, while the underlying physical memory of the host system is called physical memory.

Figure 3:
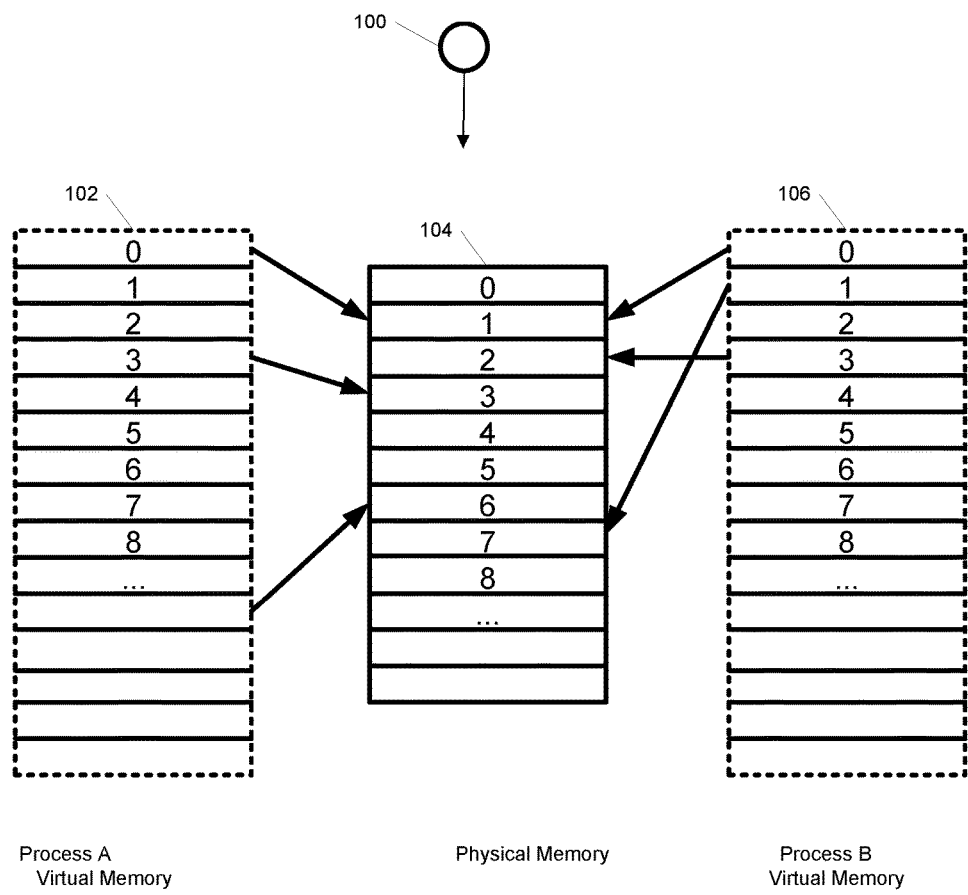
FIG. 3 is a block diagram illustrating virtual and physical memory and their mappings

FIG. 3 illustrates by way of example embodiment 100, the relationship between process virtual memory and physical memory. Process A's virtual memory 102 is broken into pages. Each allocated page in virtual memory is mapped to a page in physical memory 104. By way of example page zero in process A's virtual memory 102 is mapped to page frame 1 in physical memory, and page 3 in process A's virtual memory is mapped to page frame 3 in physical memory. Process B's virtual memory 106 page address zero is mapped to page frame 1 in physical memory while page 2 in virtual memory is mapped to page frame 7 in physical memory. Page frames in physical memory may be shared between two processes as illustrated for page frame 1. While nomenclature and some of the finer details vary between operating systems, the disclosures above generally describe the mechanics on Linux and Windows and the nomenclature set forth is used in the following for teachings on both Linux and Windows.

2.2 Resources and Processes

Each process has resources attached. By way of example, on the Linux operating system, information related to a running process is captured and stored in the task_struct structure or can be retrieved via said task_struct. Some of the data kept in the task_struct is process execution status, process hierarchy, allocated memory, process credentials, memberships, signals, resources in use and thread information. As the task_struct is a kernel data structure the information stored within is generally not accessible by applications running in user space. Applications can access some of the elements using system calls abstracted out within the system libraries. Data within the task_struct, however, is accessible when running in kernel mode, a fact the present invention builds on.

The kernel also maintains a list of all running processes called the kernel task list. In newer versions of the Linux kernel the kernel task list is private and can therefore not be directly accessed. The present invention does therefore not rely on the global kernel task list; rather it relies only on the local task_struct for the process currently being accessed and uses a user-space library to coordinate access to different processes.

2.3 Device Drivers

Device drivers provide implementation of hardware specific interfaces. Both Linux and Windows provide generic device support and impose certain architectural constraints on drivers in order to provide universal support for a large number of drivers. By way of example, operating systems provide device drivers for access to hard disks, CD ROM drives, USB, internal and external peripherals. By way of example, when an application opens a file, a device driver is ultimately responsible for retrieving or writing data to said file.

Device drivers thus enable access to very specific resources using well-defined mechanisms offered by the kernel and abstracted out by the system libraries. Device drivers run as part of the kernel either built-in or dynamically loaded as a loadable kernel module. As such, device drivers have access to the kernel internals and can inspect and manipulate kernel structures. The present invention builds on these facts to offer checkpointing services, where key elements of said checkpointing services are provided as a checkpointing device driver.

Figure 4:
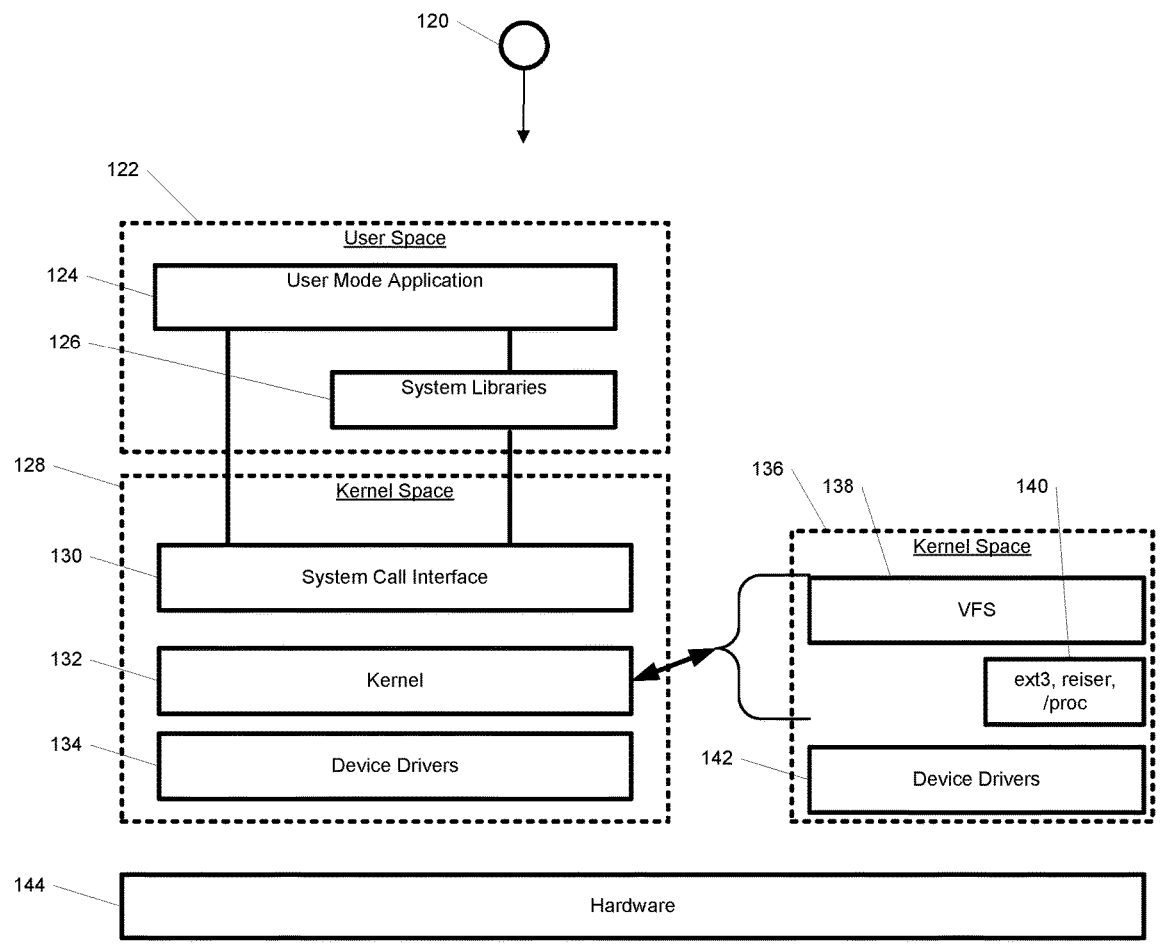
FIG. 4 is a block diagram illustrating use of the virtual file system

FIG. 4 illustrates by way of example embodiment 120 the structure on the Linux operating system. An application 124 runs in user space 122. Kernel functionality is accessed either directly from the application through sys calls, or through the system libraries 126. Within kernel space 128, the System Call Interface 130 receives and processes the system call. The system call is translated into a call into the kernel 132, where it's processed, eventually passed through one or more device drivers 134 and the underlying hardware 144 is accessed. For many devices, the Virtual File System (VFS) is used a common abstraction. The VFS 138 is a kernel module 136 and provides a "standard file system" that defines services and interface many devices must support. VFS is generally mounted over a file systems such as ext3, ext4, XFS, and Reiser 140 for block devices, and directly over the character driver for a character device. Even virtual file system, such as the /proc file system, is provided within the context of VFS. VFS and the extended file systems ultimately rely on one or more device drivers 142 to access the storage media 144.

As illustrated in the example embodiment 120 on FIG. 4 user-space application never directly access the device driver; rather the device driver is accessed going through standard kernel interfaces (System Call Interface) using abstractions such as VFS. The present invention utilizes the VFS abstraction as well, and provides checkpointing that from the applications perspective looks like reading files from a file system. Likewise, restoring checkpoints looks like writing a file to a file system.

3 CHECKPOINTING DEVICE DRIVER INTRODUCTION

In the following disclosures we follow the Linux naming convention, where device drivers are installed in the "/dev" directory. In the following disclosure the checkpointer device driver is named "ckpt" and the full pathname is thus "/dev/ckpt". The actual device name is not important as long as it's different from other device names supported by the kernel and available in the /dev or other directory.

By way of example, /dev/ckpt is implemented as a character device. The disclosed functionality of /dev/ckpt could also be implemented as a block device, which is obvious to anyone with ordinary skills in the art. Therefore, the preferred embodiment uses a character device while an alternate implementation uses a block device. Character devices and block devices are both known in the art and the following disclosures will thus focus on aspects relevant to the present invention.

A character device is identified by its major device number. By way of example, the following teachings use a major device number of CKPT_MAJOR_NUM. For testing purposes the locally reserved numbers in the range 240 to 254 can be used. By way of example on the Linux operating system, the device node is create as
mknod/dev/ckpt c CKPT_MAJOR_NUM 0

3.1 File Operations

The internal structure of a device driver must declare the file_operations supported by the device. By way of example, ckpt file_operations is defined as follows:
    struct file_operation ckpt_fops={
    .owner=THIS_MODULE,
    .open=ckpt_open,
    .release=ckpt_release,
    .read=ckpt_read,
    .write=ckpt_write,
    .ioctl=ckpt_ioctl,
    .seek=ckpt_seek,
    };

Here each of the device driver functions ckpt_open, ckpt_release, ckpt_read, ckpt_write, ckpt_ioctl and ckpt_seek are assigned to their respective file_operations.

ckpt_open is used to initialize the device driver, ckpt_release to release all resources associated with the device before taking the device down. ckpt_read and ckpt_write are used to read and write bytes of data respectively, ckpt_ioctl is used to query the device driver for special status information, and ckpt_seek is used to reset the current position in the device. Finally THIS_MODULE identifies the module.

In addition to open/read/write/release calls, the /dev/ckpt also contains kernel module initialization. The module initialization and termination is often called module_init( ) and module_exit( ) in reference to the commonly found declarations in kernel modules. By way of example the following teachings use the terminology ckpt_module_init( ) and ckpt_module_exit( ) or said functions of within the context of the present invention.

In the preferred embodiment ckpt_module_init( ) call registers the device with the operating system.
static int_init ckpt_module_init(void)
{
  int ret;
  if ((ret=register_chrdev(CKPT_MAJOR_NUM, "ckpt", &ckpt_fops))<0)
    printk(KERN_ERR "ckpt_module_init: % d\n",ret);
  return ret;
}

The register_chrdev call provides the registration information that allows the operating system to map the /dev/ckpt to the actual device driver.

Similarly ckpt_module_exit( ) unregisters the module with a preferred embodiment as
static void_exit ckpt_module_exit(void)
{
unregister_chrdev(CKPT_MAJOR_NUM, "ckpt");
}

3.2 Conceptual Use of /Dev/Ckpt

By way of example, the /dev/ckpt checkpointer module may be loaded using the standard Linux command insmod and the /dev/ckpt checkpointer may be unloaded using the Linux command rmmod. Both command are well known in the art and will not be described further herein.

Figure 5:
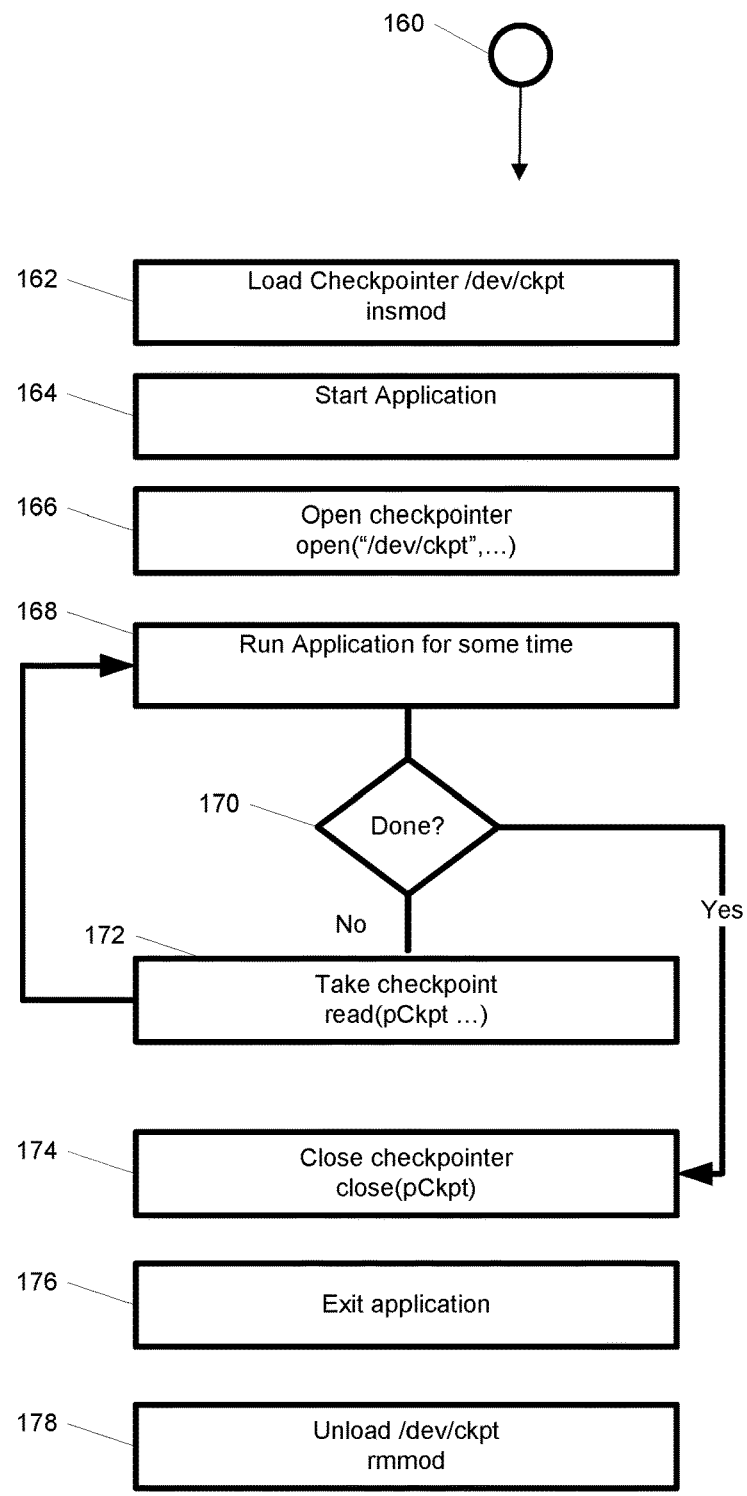
FIG. 5 is a block diagram illustrating the checkpointing process

The /dev/ckpt checkpointer is accessed from user space like any other file or device. In the preferred embodiment the checkpointer is opened, ignoring error handling, using code similar to pCkpt=open("/dev/ckpt",O_RDWR);
and the checkpointer is closed using code like
close(pCkpt);

In the preferred embodiment, a checkpoint is created by reading from /dev/ckpt using code like readCount=read(pCkpt,buffer,size);

and a restore from checkpoint is accomplished by writing to /dev/ckpt using code like writtenCount=write(pCkpt,buffer,size);

FIG. 5 illustrates by way of example embodiment 160 the overall flow of the checkpointing process. First 162 the /dev/ckpt checkpointer module is loaded using, by way of example, the insmod command. The application is then started 164. As part of loading the application interceptors are loaded containing the user-space components of the checkpointer. The checkpointer is started 166 by way of the /dev/ckpt open command. The application is then let run 168 for some period of time. If the application is not finished processing 170 the checkpointer is activated 172. A checkpoint is taken through the /dev/ckpt read command 172, and the application let run again 168. If the application is done running 170 the checkpointer is closed 174, the application exited 176 and the /dev/ckpt checkpointer unloaded using by way of example rmmod.

The finer details of the checkpointing process and its interaction with the user-space interceptors are disclosed in the next sections.

4.0 USER-SPACE SHARED LIBRARY

On the Linux operating systems new processes are created by the combined use of fork( ) and exec( ). On Windows, processes may be created by using the CreateProcess( ) call. As described above, the disclosures of the present invention use the terminology fork( ) and exec( ) to designate the process creating interfaces on all operating system.

The user-space functionality is pre-loaded as a library as part of initially loading the initial application process and later every time a new process is created. The user-space library provides the following functionality a. Creation of a dedicated checkpointing thread for each process b. Preparation of Barrier for process and threads within process c. Collection of checkpoint data by calling /dev/ckpt d. Flushing of system resources e. Resource virtualization, Application Virtualization Space (AVS).

As part of checkpointing, the present invention deterministically halts execution of the application being checkpointed. Halting of a multi-process multi-threaded application is achieved using barrier synchronization (as defined in "Brief summary of Invention"). The use of Barrier synchronization for halting a multi-process multi-threaded application is taught in U.S. Pat. No. 7,293,200 Neary et al and included in its entirety by reference. The use of a barrier within the context of the present invention is disclosed below.

Where Neary et al. provides the actual checkpointing facility in a "check point library" running in user-space, the present invention provides the core checkpointing facility as a kernel module. The present invention utilizes the barrier from the Neary, and eliminates the need for the checkpointer to run in user space. Moving the checkpointer from user-space to kernel-space has several advantages: 1) it essentially removes the dependency on the system libraries found in Neary, 2) it eliminates the need to closely track application and library interactions, as all checkpointing is done in the kernel sitting under the system libraries, and 3) it automatically includes all memory allocated in the address space of the application without the need to special case stacks, code, text and shared memory.

The present invention creates a checkpointing thread per process as taught in Neary. However, contrary to Neary, the checkpointer thread calls the /dev/ckpt to collect the checkpoint and does not itself create the checkpoint for its parent process.

Figure 6:
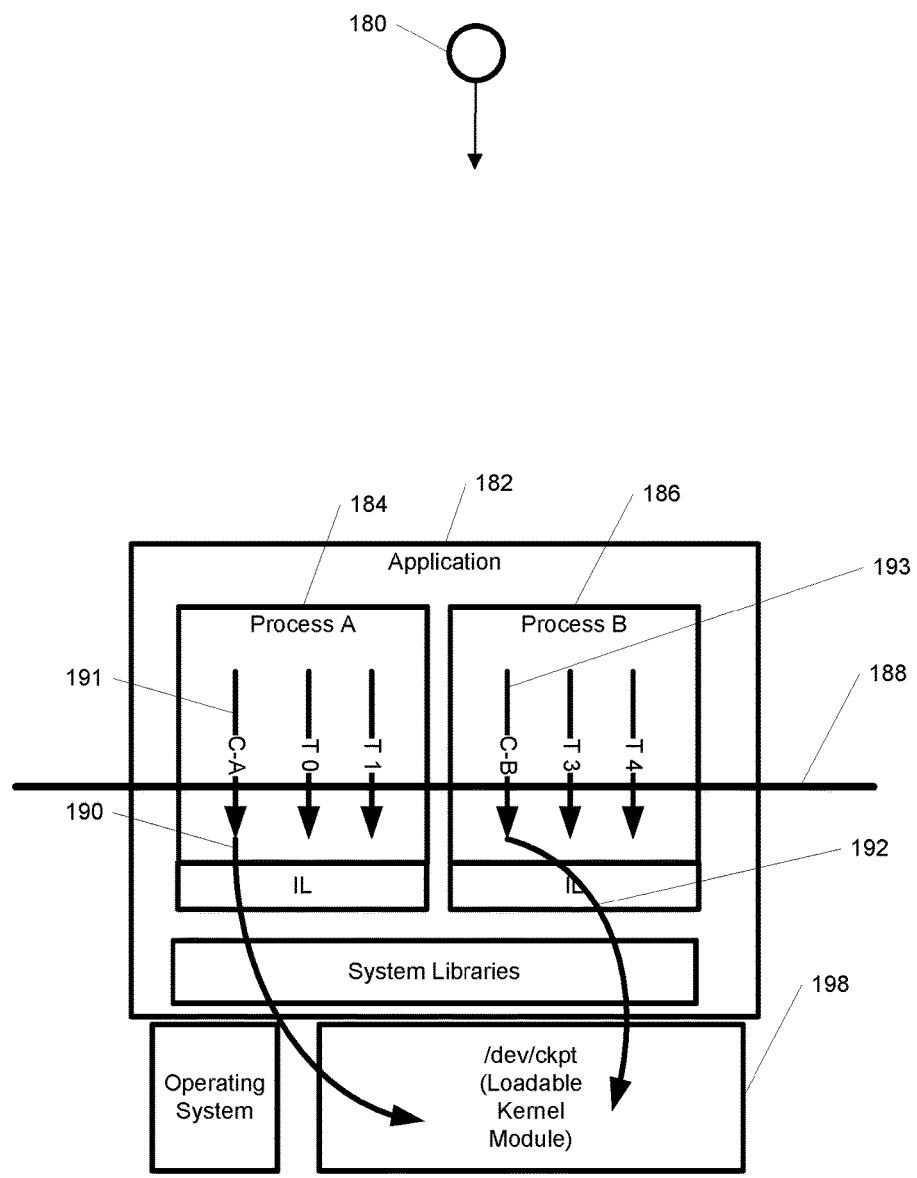
FIG. 6 is a block diagram illustrating the interaction of the barrier, checkpointer threads, and kernel module.

FIG. 6 illustrates by way of example embodiment 180 an application 182 with two processes, process A 184 with two threads T1 and T2 and process B 186 with two threads T3 and T4. Process A additionally contains the checkpointer thread C-A 191 and process B contains checkpointer thread C-B 193. The Barrier 188 indicates a place in the execution of process A, process B and threads T1, T2, T3 and T4 where all processes and threads are halted. With all activity in user space halted at the barrier, the kernel module checkpointer (/dev/ckpt) 198 can collect all relevant process state and build a checkpoint. Each process collects its own checkpoint via the kernel module as indicated for process A 190 via its checkpointer thread C-A 191 and process B 192 via its checkpointer thread 193

In contrast to Neary and Backensto, the user-space library of the present invention contains only the barrier, checkpointer thread, flushing, AVS and collection of checkpoint data. There is no need to keep track of memory allocations, including those hidden within the system libraries, as all checkpointing data is collected in the kernel. This is a dramatic simplification over the user-space checkpointer and does not require customized system libraries.

4.1 Flushing of TCP/IP

If, by way of example, an application uses TCP/IP with the socket-programming model, select TCP and socket state and data are implicitly included in the application state, even though the data may reside in the TCP stack or associated device driver. As previously disclosed, the present invention does not attempt to access kernel structures for non-application processes and thus approaches the problem of the TCP and socket state from the application layer. While application and socket buffers generally are included in the applications memory image that is not the case for kernel and device buffers related to the lower levels of the TCP/IP stack and the network device itself. In the preferred embodiment the approach taken is to flush all TCP and socket communication in order to move data through the buffers thereby ensuring that the buffers outside the application are in a consistent state with respect to the application. Flushing of TCP sockets may be achieved in a number of ways including but not limited to closing the socket, which forces a flush and then reopening the socket, setting the TCP_NODELAY socket option or through application specific flush operations. In an alternate embodiment the TCP and device kernel buffers are extracted in kernel module without requiring any flushing operations.

Resources accessible from the task_struct can be flushed directly by the kernel module checkpointer and does therefore not need flushing from user space. Only resources with kernel functionality outside the task_struct, such as TCP/IP, require flushing from user space.

Generally, resources are flushed as part of the checkpointing process in order to move data out of low-level buffers located outside the address space of application processes, through the operating system and onto or into the devices.

4.2 Application Virtualization Space—AVS

Instantiated resources generally are only meaningful in the context of the operating system where the application is running. By way of example the operating system assigns each process a unique process ID (PID). At any point in time each process on a particular node has a unique process ID. If the process is stopped and re-started it may not get the same PID. Likewise, if the process is started on a different node, the PID may be different. Some applications query the operating for their own PID and use the PID for a variety of purposes. For a checkpoint image to be meaningful, it's thus important that the PID is presented to applications with the value it had at the time of taking the checkpoint.

A structure called the Application Virtualization Space (AVS) is used, to continue to example, to store the PID at the time the process is created and when the PID is accessed at later time through the defined APIs, to retrieve it from the AVS. At the time the process, and thus the PID, is first created the PID is recorded within the AVS for the particular process and kept associated with process as long as it's running. When the process calls getpid( ) to get the associated PID, the values stored in the AVS is returned, as opposed to the PID provided by the underlying operating system. This ensures that dependencies on PIDs are virtualized and preserved across checkpoints. Similar teachings apply to thread IDs (TIDs), and other system constructs such as IPC, signal, and named semaphores.

Files are handled in a similar manner. By way of example, the file name, path, and attributes are stored in the AVS. As part of restoring an application from a checkpoint, the contents within the AVS is used to recreate the data structures used by the operating system to represent the file, i.e. the file's name, path, and attributes. Current file state, such as file position, is contained within the checkpoint and does not need to be included in the AVS; the AVS only needs the minimal information required to re-create the resource and the checkpoint then contains the current state.

Similarly, network state such as state of sockets, may be included in the AVS. As with files, only the data relevant to re-creation of the resource is required, while current state is contained within the checkpoint.

The AVS entries are created when resources are created or opened, and removed from the AVS when the resource is closed. By way of example, this means that the AVS entry for a file is created when the file is opened, and removed when the file is closed. The AVS is generally not involved with individual file operations, such as reading or writing data, only in creating file pointers that are meaningful in the context of the operating system and the associated checkpoint.

The AVS thus contains an application-specific private name space for resources, and maintains mappings between resources within the initial instances of application resources and their possibly different values when running in a different environment at another time. In the example embodiment, the AVS mappings are implemented using a hash table. In other embodiments the AVS is implemented using a database or custom coding.

5. CHECKPOINTING IN KERNEL MODULE /DEV/CKPT

As disclosed in section 3 the read( )method of /dev/ckpt is called to retrieve checkpoint data from the kernel. As disclosed in section 4, read( ) is called within the barrier, so the underlying process is not executing application code.

As taught in section 2 all state information for a particular process is stored in or can be found from the process's task_struct structure. By way of example on the Linux operating system, the task_struct for the current process can be found by the current macro. In continuation of section 3 an example embodiment, without error handling, of the read function for /dev/ckpt is

```
static ssize_t ckpt_read(struct file *filp,
char *ubuff, size_t count, loff_t *f_pos)
{
// pMem is a pointer to memory seen from
// the kernel
Set pMem to the current address in filp
// copy to user space
eCount=copy_to_user(ubuff,pMem, count)
nBytes=(eCount==0)? count: (count+eCount);
f_pos+=nBytes;
return count
}
``` copy_to_user( ) returns zero if count bytes have been copied or –eCount if only ecount bytes were transmitted. nBytes represents the number of bytes actually transferred to user space. In an alternate embodiment a page is memory mapped into user-space and the checkpoint data copied directly into said memory mapped page.

Generally, attempting to access a memory location not allocated to the process causes a page fault. However, copy_to_user( ) specifically deals with this issue by validating addresses before the copy operation. If the page is invalid, i.e. the linux function access_ok( ) returns zero, copy_to_user( ) does not attempt to access the page, and the function returns without attempting to copy data. It is thus not necessary to check every page before attempting to copy.

In an alternate preferred embodiment, the page data is transferred to user-space using memory mapped pages.

Each of these steps are now disclosed in further detail.

5.1 Collecting Memory State

The process's task_struct contains a data structure mm_struct which contains the relevant information regarding said process's virtual memory. The mm_struct contains the kernel data structures necessary to determine which memory pages are used by the process.

By way of example, the start and end of code may be found using the start_code and end_code variables, the start and end of data with the start_data and end_data, the start and end of the heap with start_brk and brk. Similar variables may exist for stack, environment and arguments.

As memory is organized in pages within the kernel, the most efficient operation of /dev/ckpt is in units of memory pages, as opposed to units of bytes. However, since the core device read( ) operations operates in units of bytes, the calling process preferably aligns calls to read( ) on page boundaries and requests blocks of bytes with the size of a page. In the preferred embodiment, a call to read( ) may thus look like read(filp,ubuff,PAGE_SIZE,p_pos). The read( ) function return the number of bytes read as a means of communicating success or error. If e.g. zero (0) is returned, it means that zero bytes were actually read into ubuff.

By way of example embodiment, and in continuation of the example in section 3.2, the calling process may call/dev/ckpt with pseudo code like

```
unsigned byte ubuff[PAGE_SIZE];
// open device
// set/reset filepos to zero.
seek(fp,0);
for(int i=0; i<maxMem; i+=PAGE_SIZE)
{
``` count=read(fp,ubuff,PAGE_SIZE)
if (count>0) save checkpoint of page
  stored in ubuff
}

The/dev/ckpt driver may optimize the checkpointing process by using the previously disclosed information about start and end of code, text, stack etc. The checkpointer may thus check the address of the current read request to verify that it falls outside the pages used by the process and if that is the case, immediately return a value of zero to indicate that no application process data was available for the requested read( ) operation. A related optimization is that on some operating systems such as Linux a certain number of pages in low memory are left unused to catch null-pointers. Similarly, the operating system kernel may, by way of example, reside in the upper or lower 1 GB of the memory address space and may thus be skipped by the checkpointer. Each operating system is slightly different, and may offer opportunity for such simple optimizations of the checkpointing process.

In the example, the user-space buffer ubuff is fixed and pre-allocated, and thus automatically included in the checkpoint as well. However, since ubuff is used in a transient manner with data flowing through, its content does not need to be preserved as part of a checkpoint.

5.2 Flushing of System Resources

In the preferred embodiment disclosed above, TCP/IP connections are flushed from the user-space library. Other system resources, such as IPC is generally contained within the task_struct and can thus be captured by/dev/ckpt by accessing resource within the address space of the current process. Examples include, but are not limited to the System V semaphores sysvmem, open files identified by *files and state of signal handlers. In these cases/dev/ckpt can access the resource internals and flush buffers as supported by the device.

5.3 Integration with User-Space Library

As disclosed above the kernel module checkpointer/dev/ckpt is called by the checkpointing thread for a process to collects a specified number of memory bytes, typically a page, for said process. The/dev/ckpt checkpointer does thus not need to access the address space of any other processes, nor does it need to know about other processes.

Conversely, the user-space library is responsible for coordination across all processes comprising an application. The barrier contained within the user-space library brings every application process and thread into a stable locked state where the application processes and threads do not execute. With the application essentially halted, the checkpointer thread for each process can call/dev/ckpt and assemble the memory pages comprising the application image.

5.4 Deterministic Halting at the Barrier

Figure 7:
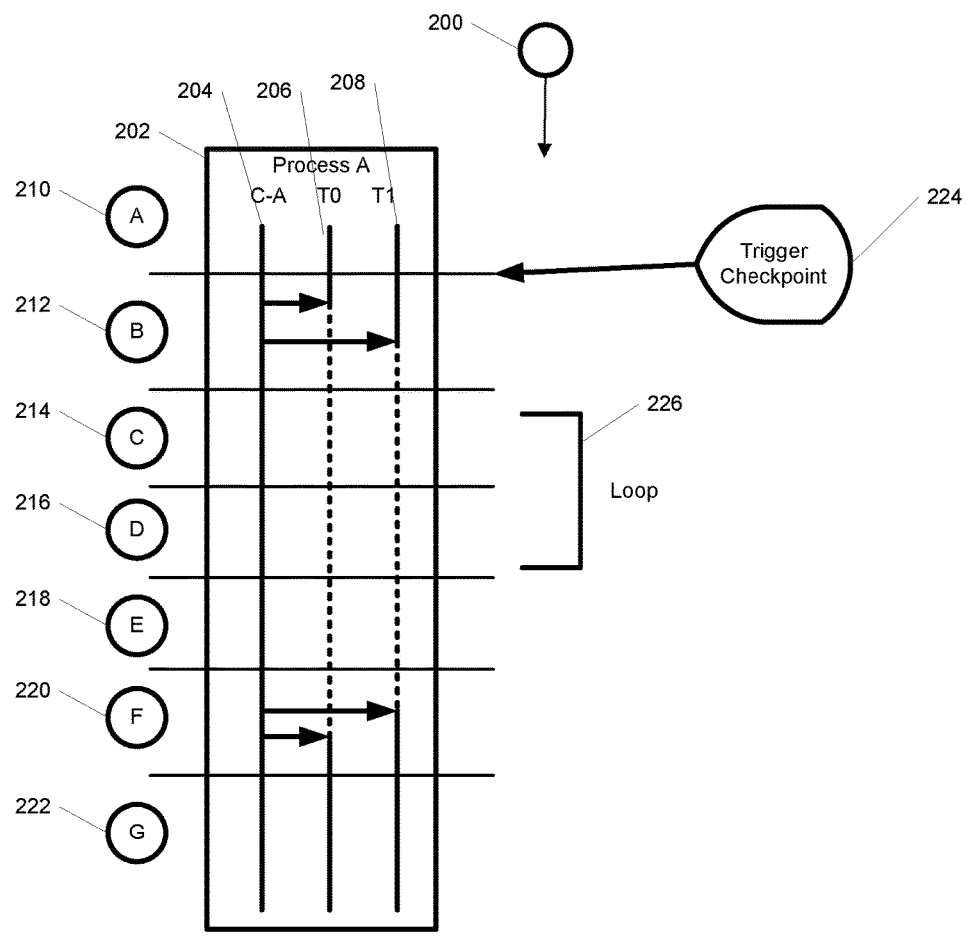
FIG. 7 is a block diagram illustrating the barrier.

The inner working of the barrier as it relates to the checkpointing process is now disclosed. FIG. 7 illustrates by way of example embodiment 200 an application with one process 202 containing to process threads T0 206 and T1 208 and the checkpointer thread 204 as disclosed above. Multiple processes are handled in a similar manner.

Initially the application the process is running A 210 with the checkpointer thread 204 and the two process threads 206, 208 operating. At some point a checkpoint is triggered 224. The checkpoint trigger activates the barrier and transitions into waiting B 212 for T0 and T1 to stop at the barrier. When both T0 and T1 are stopped at the barrier the checkpointing thread 204 starts assembling the checkpoint C 214. As disclosed previously, the checkpoint assembly comprises collecting memory and kernel state for the process 202. Kernel buffers are flushed and relevant state information saved along with the memory state. Said checkpoint state is then written to disk D 216. In the preferred embodiment disclosed previously states C 214 and D 216 are interleaved, in that one or more memory pages repeatedly are collected then written to disk. That loop is indicated with the callout 226 next to state C and D. If a kernel device had to be halted as part of flushing, the device is activated again E 218, and the checkpointer transitions to state F 220 where individual threads T0 and T1 are released in reverse order from the barrier. Upon being released, the application process 202 runs again G 222.

5.5 Triggering of Checkpoints

Checkpoints may be triggered in a variety of ways. By way of example, a checkpoint may be triggered after a certain elapsed time, if the CPU temperature exceeds a certain level, if a memory threshold is met, if a storage threshold is met, if a network traffic threshold is meet, if a new server as added, after changes in configuration, in response to an external script or program, or manually by the administrator. The teachings of the present invention are independent of how the checkpoints are triggered and triggering will therefore not be further described.

6. MANAGEMENT OF MEMORY USING PAGE TABLES AND PTES

As taught above, memory is divided in the pages and presented to an individual process as a virtual address space.

Page tables are used to establish a mapping between a user-space process's virtual address space and the physical memory of the system. The use of page tables is well known in the art (http://en.wikipedia.org/wiki/Page_table) and will only be described to the extent that is required to fully disclose the present invention. Page tables are often multi-level; by way of example Linux generally uses four levels to fully break down an address across page table levels. Modern CPUs, such as x32/x64/AMD and SPARC, have memory management units (MMUs) that traverse the page tables to make memory addressing efficient and fast.

Figure 11:
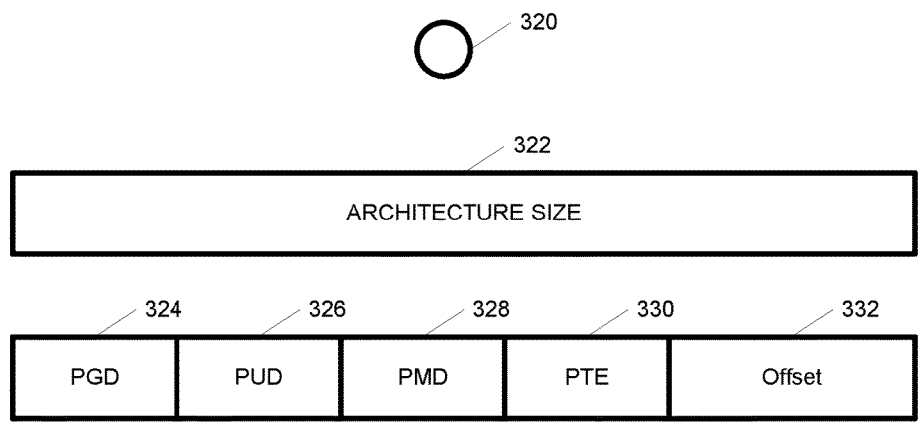
FIG. 11 is a block diagram illustrating breakdown of virtual addresses

The levels of the page table hierarchy are often given names. FIG. 11 illustrates by way of example embodiment 320 the names commonly used on Linux. The basic size of an address 322 is given as 'architecture size'. It's generally 32 or 64. PGD 324 is the Page Global Directory; PUD 326 is the Page Upper Directory; PMD 328 the Page Middle Directory and PTE 330 the Page Table Entry. Offset 332 designates the offset within the PTE. The page table designated by PTE contains the actual information about the page including access flag. By way of example, the PTE contains the following flags relevant for the teachings of the present invention:

_PAGE_ACCESSED which generally is set automatically by the CPU to designate that the page has been accesses with a read or write operation _PAGE_DIRTY which generally is set automatically by the CPU to indicate that the page "dirty", i.e. that the page's content has been modified.

By way of example, the Linux operating system provides a family of functions to access and work with said PTE page table. Some of the functions relevant for the present teachings are pte_present( ): is the page present in the system
pte_read( ) can page be read
pte_write( ) can page be written
pte_dirty( ) is page dirty The entire family of pte calls is documented in the Linux kernel sources at www.kernel.org.

As a process executes, the CPU continuously updates the _PAGE_ACCESSED and _PAGE_DIRTY bits. Most modern CPUs provide _PAGE_ACCESSED and _PAGE_DIRTY flags, or they are implemented in software by the operating system. In the following _PAGE_ACCESSED and _PAGE_DIRTY is used to designate said functionality on all CPUs independently of whether the CPU provides native support or the support is provided by the underlying operating system. These teachings are combined with section 9 to further optimize the checkpointing process.

To find the page corresponding to a virtual memory address, the page table needs to be traversed. An example embodiment of Traversing the page table without error handling, is given in the following pseudo code:

```
static struct page find_page(struct mm_struct mm,
unsigned long address);
{
pgd=pgd_offset(mm, address)
pmd=pmd_offset(pgd,address);
pte=pte_offset(pmd,address);
return pte_page(pte);
}
```

Where pgd, pmd, and pte designate the Page Global Directory, Page Middle Directory, and Page Table Entry introduced above. The incremental checkpointer collects and uses state from the individual pages. The previously disclosed algorithm is used in a preferred embodiment to find the page associated with a particular virtual memory address.

7. STRUCTURE OF CHECKPOINT

The checkpoint of a multi process application is comprised of state global to the operating system, state shared across all processes within the application, and state for each process including the state of all threads within said process.

Figure 8:
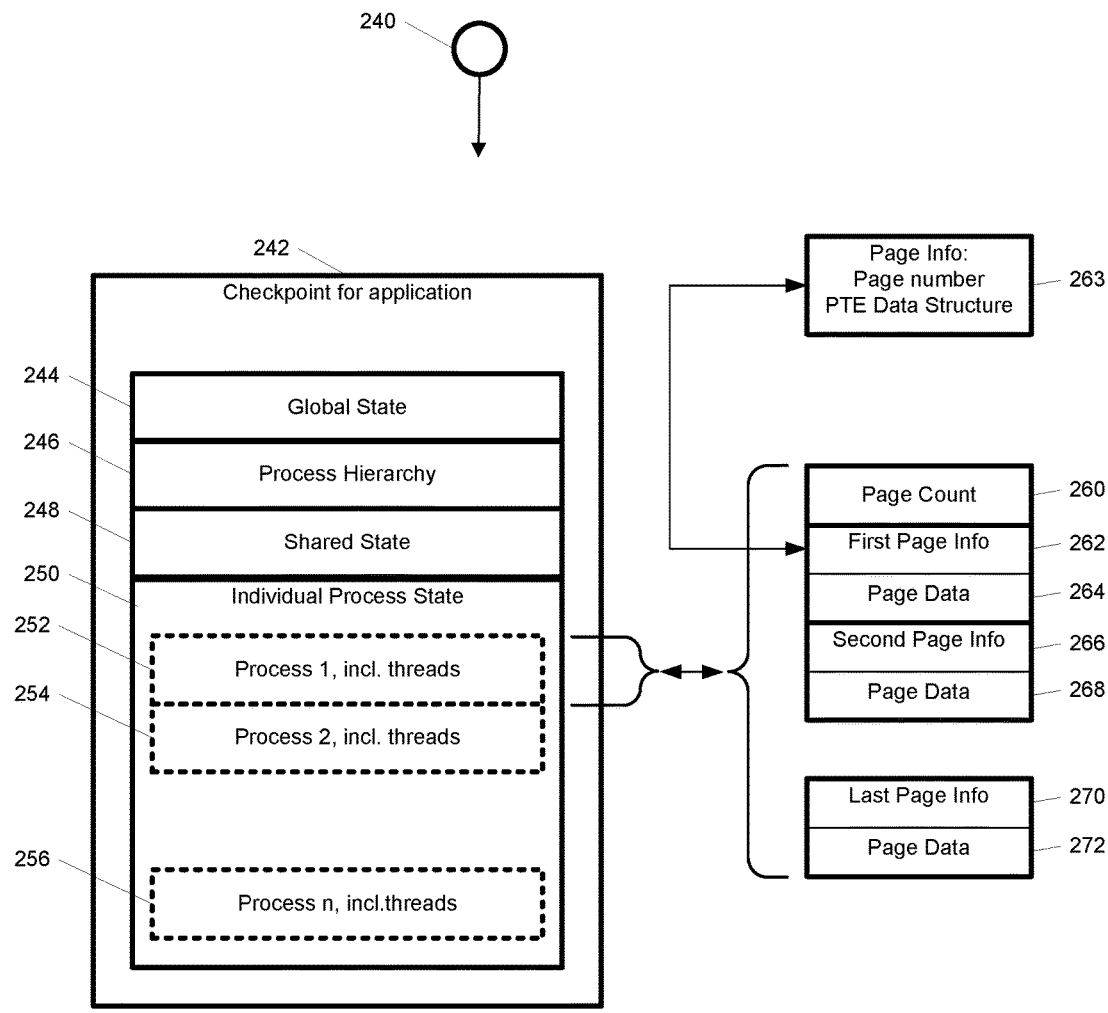
FIG. 8 is a block diagram illustrating the structure of a checkpoint.

FIG. 8 illustrates by way of example embodiment 240 the structure of an application checkpoint 242. The checkpoint is comprised of state global to the application on the operating system 244. This includes the AVS and other data that is system global. The process hierarchy 246 contains the hierarchy of processes comprising the application and shared data 248 contains information on all shared data between processes within the application. Examples of shared data include names of shared semaphores, shared memory etc. The checkpoint data for the individual processes 250 is comprised of individual checkpoints for each process. By way of example, the checkpoint for process 1 252 is followed by the checkpoint for process 2, and so on until the last process, process 'n' 256.

FIG. 8 also illustrates by way of example embodiment 240 the layout of the checkpoint for individual processes. By way of example the checkpoint for process 1 252 is comprised of the following data. First the total number of pages in the checkpoint 260 is provided as a means of boundary checking and error recovery. Each memory page included in the checkpoint is identified by a page info block 263. A page info block 263 contains information describing the page, including but not limited to page start address, physical page state information as contained in the PTE, and virtual address space page state information as contained in the associated VMA. Disclosures related to VMA are presented in the next section.

By way of example, the page info for the first page in the checkpoint 262 is followed by the data contained in said first page 264. This is followed by the page info for the second page 266 in the checkpoint and the data contained in said second page 268. The same layout is followed until the last page info 270 is reached and the data contained in said last page 272.

The layout of the individual process checkpoints in the just disclosed example embodiment allows for saving of only those pages used by the application, and thus supports the checkpointer optimizations previously disclosed in section 5.1.

Methods for storing the hash tables as used by AVS are well known in the art and will therefore not be discussed in further detail. Likewise, methods for storing trees, as used by the process hierarchy, are well known in the art and will therefore not be discussed further

8. CHECKPOINT OPTIMIZATIONS USING VMAS

Within the virtual address space of a process Linux uses the technique of Virtual Memory Areas (VMAs), also called Regions, to manage memory and further refine the access rights to individual pages or groups of pages. In the disclosures the terms Region and VMA are used interchangeably to represents an interval of address space that is a multiple of the underlying page size. VMAs do not overlap and all pages within a VMA have the same attributes.

By way of example, on Linux the mm_struct data structure contains a list of vm_area_structs (called *mmap) with the elements in the list representing a VMAs and their underlying component VMAs. This hierarchical layout makes it easy to assemble a checkpoint comprised of all process pages.

By way of example, the relevant element of the mm_struct data structure is

```
struct mm_struct {
struct vm_area_struct *mmap;
. . .
};
```

While the relevant elements of the vm_area_struct are:

```
struct vm_area_struct {
struct mm_struct *vm_mm;
unsigned long vm_start; // starting address
unsigned long vm_end; // end address+1
struct vm_area_struct *vm_next; // next element
};
```

Figure 12:
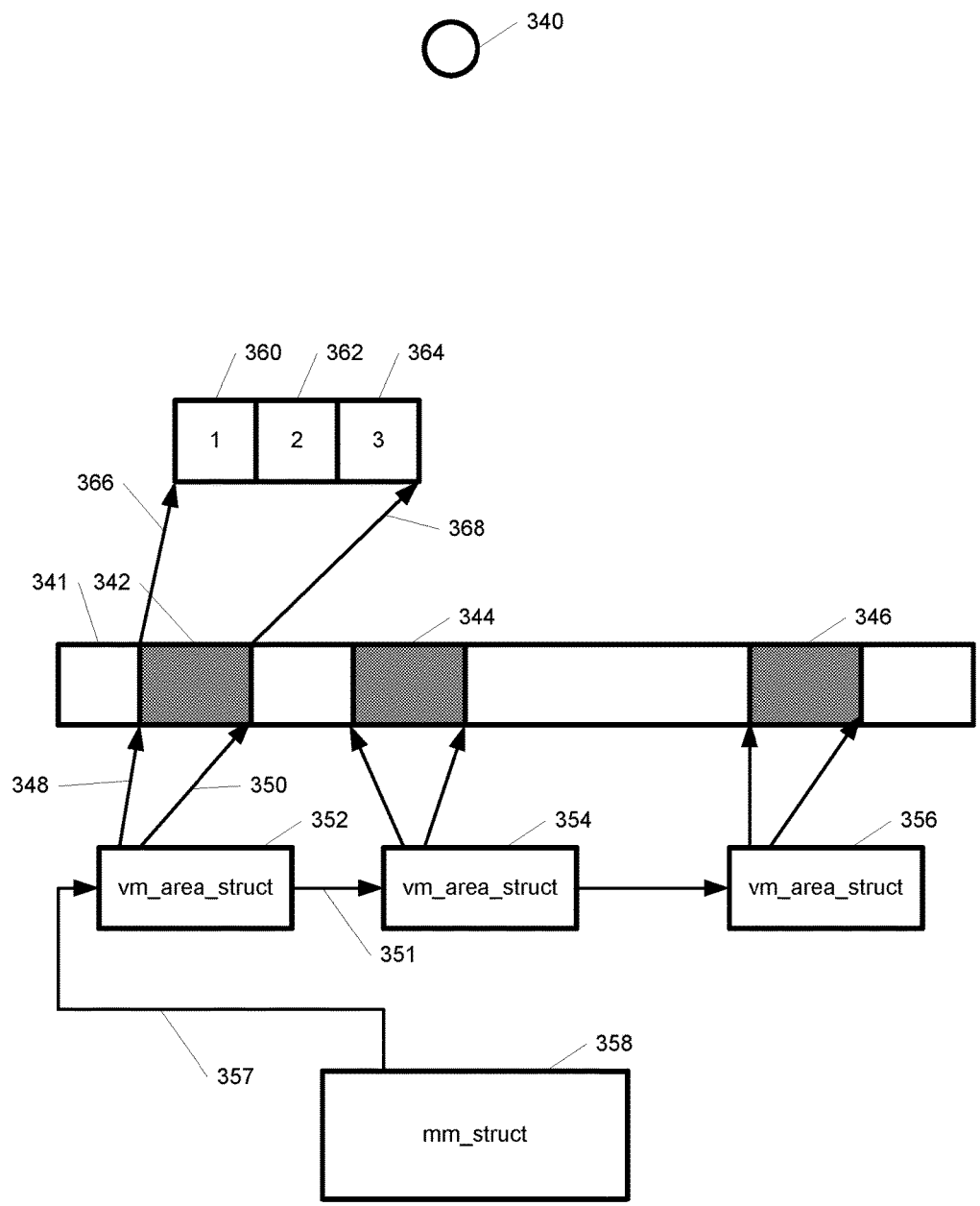
FIG. 12 is a block diagram illustrating VMAs

FIG. 12 illustrates by way of example embodiment 340 the use of VMAs to optimize the checkpointing process. The process's full virtual address space 341 contains three VMAs; first VMA 342, second VMA 344 and third VMA 346. The underlying mm_struct 358 from the process contains the *mmap pointer 357 to the list of vm_area_structs representing the underlying VMAs comprising the processes address space. First vm_area_struct 352 contains vm_start 348 and vm_end 350 pointers. The *vm_next 351 pointer, points to the next vm_area_struct. The second vm_area_struct 354 and the third vm_area_struct likewise identify the vm_start and vm_end memory locations and provide a pointer to the next vm_area_struct if applicable.

Based on the disclosures above, checkpointing may thus be optimized by traversing the list of vm_area_structs found from the mm_struct (*mm) located within the task_struct. Contrary to the teachings in section 5, by traversing the VMAs each set of pages are known to be in use by the process and will thus not cause page faults that need masking. This, however, means that the user-space checkpointing disclosed in section 5.1 no longer is adequate as the calling read( ) function no longer can pre-determine the address of the page being read( ), i.e. checkpointed. The following disclosures describe a preferred embodiment with of /dev/ckpt and associated user-space calling method to support dynamic and interactive checkpointing optimized by using the VMAs.

By way of example, we examine the example embodiment 340 on FIG. 12 and look at the first memory VMA 342. By way of example said first memory VMA is comprised of three pages of memory. First page 360, second page 362, and third page 364. The start address of the first VMA 348 corresponds to the start of the first page 366, while the end of the first memory VMA 350 corresponds to the end of the third and last page 368 in the VMA. To read( ) i.e. checkpoint, said first VMA, the read( ) call is called three times, one for each page, and the offset (*f_pos) advanced to the next page. For the very first call, the calling function seeks to the position of zero, indicating that this is a new checkpoint. This in turn signals the checkpointer to identify the first memory VMA and read the first page in said first VMA. Upon completing the read( ) operation the offset is advanced to the next page which is either in the same VMA or the next VMA in the list. When a read( ) reaches the end of the list of VMAs and has read the last page, zero is returned to indicated "end of checkpoint".

An example embodiment in pseudo code is:
```
static ssize_t ckpt_read(struct file *filp,
char *ubuff, size_t count, loff_t *f_pos)
{
if (f_pos==0)
{// new checkpoint
   // find start page for first vma
   pMem=address of first page in first vma
}
else
{
   pMem=address by f_pos
}
If (f_pos indicates end of address space)
   return 0; // we're done
// read page and copy to user space
eCount=copy_to_user(ubuff,pMem, count)
nBytes=(eCount==0)? count: (count+eCount);
f_pos+=nBytes;
// move to start of next page or end address
return count
}
```

Figure 13:
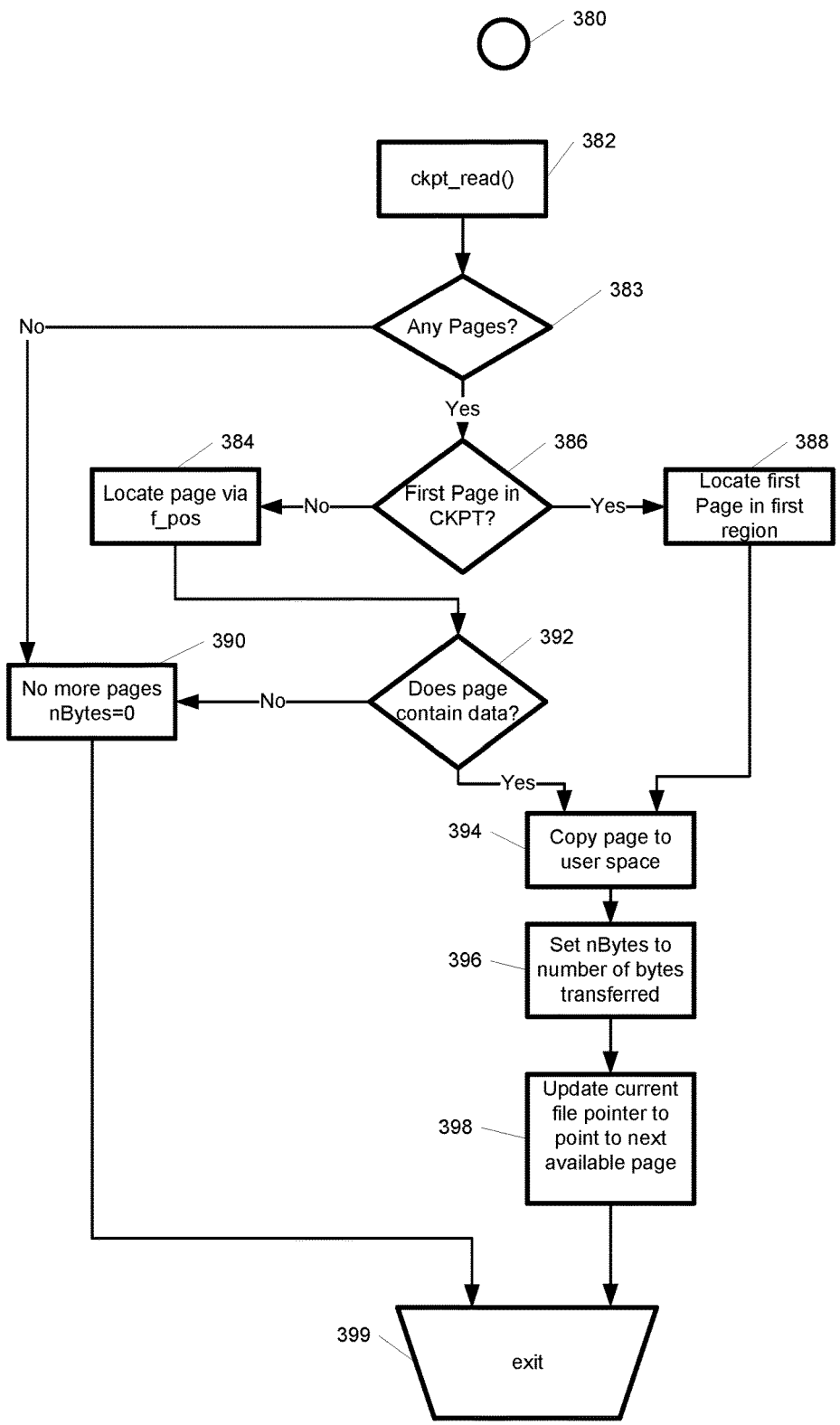
FIG. 13 is a block diagram illustrating checkpointing by VMA

FIG. 13 illustrates by way of example embodiment 380 the pseudo code in further detail. First the ckpt_read( ) is called 382. It is then determined if there are any virtual memory pages 383. This may be accomplished by checking the size of the *mmap list in the mm_struct. If there are no pages to be checkpointed the nBytes variable is set to zero and the function returns. If there are pages 383 it is then determined 386 if this is the start of a new checkpoint, i.e. if this is the first page in the checkpoint. The start of a new checkpoint is identified by f_pos being zero. The first page in the first VMA is then identified 388 via the mm_struct and the vm_area_struct as disclosed above. If the current call does not refer to the first page in the checkpoint 386, the page to be checkpointed is identified 384 via the f_pos variable. If f_pos identifies a page with data 392, the checkpoint is created. The checkpoint is created by copying said page to user space, setting the variable nBytes to the number of bytes transferred, and updating the f_pos value to designate the next available page. f_pos is set to the value of vm_end for the last page, and to address of the next page for all other pages. The check 392 to determine if this page contains data is thus accomplished by comparing the f_pos value to the vm_end value of the last page. In all cases, the number of bytes transferred to user space is returned by the read( ) function.

This just disclosed read( ) function requires a more sophisticated user-space caller to accommodate the different interpretation of the return values
```
unsigned byte ubuff[PAGE_SIZE];
int fd;
// set/seek to first page.
currPageAddr=lseek(fd,0, SEEK_SET); // set file pos to zero
boolean done=false;
while (!done)
{
count=read(fd,ubuff,PAGE_SIZE)
if (count>0)
{
   Save the page data (ubuff) for currPagrAddr;
   // save addr of next page to be read
   currPageAddr=lseek(fd,0,SEEK_CUR);
}
else
{
   done=true; // at the end of a checkpoint;
}
{
```
In continuation of section 3 an example embodiment, without error handling, of the seek( ) for/dev/ckpt is
```
static loff_t ckpt_seek(struct file *filp,
loff_t offset, int type)
{
loff_t newPos=*f_pos;
switch (type)
{
   case SEEK_SET: newPos=offset; break;
   case SEEK_CUR: newPos=filp→f_pos+offset;
      break;
   case SEEK_END: newPos=SIZE-offset;
      break;
   Default:
      newPos=-EINVAL;
}
filp→f_pos=newPos;
return newPos;
}
```

8.1 Further Optimizations Using PTEs

The checkpointing process may be further optimized by keeping track of which pages have been modified between successive checkpoints. Referring to FIG. 12 for illustrative purposes: The first checkpoint taken includes page 1 360, page 2 362 and page 3 364. By way of example, at the time of the second checkpoint data in pages 1 and 2 is unchanged, while the data in page 3 has changed. The only page that needs to be included is thus page 3, as pages 1 and 2 already are known and stored in an earlier checkpoint. The technique where only changed pages are checkpointed is called incremental checkpointing. As long as the processing it takes to keep track of the changes in the pages is less than the time it takes to checkpoint all pages, incremental checkpointing offers a performance improvement. If checkpointing is done frequently, the number of pages changed will generally be much lower than the total number of pages, and incremental checkpointing is thus an improvement.

By way of example, the Linux operating system keeps track of page access using the _PAGE_ACCESSED and _PAGE_DIRTY bits as previously disclosed in section 6. The bits are generally automatically set by the CPU hardware as the program is executing. The present invention repurposes the _PAGE_DIRTY bit in the following way:

After the completion of a checkpoint, the current _PAGE_DIRTY is copied into one of the unused bits in the page table entry and thereby saved for future reference. In the following disclosures _PAGE_DIRTY_COPY is used as a short hand for said copy of the _PAGE_DIRTY bit at the time of the most recent checkpoint. As the _PAGE_DIRTY bit is used by several low-level functions of the kernel, said low-level functions are updated to use _PAGE_DIRTY_COPY instead of the original _PAGE_DIRTY bit. The benefit is thus that the _PAGE_DIRTY bit, which is automatically set by the CPU hardware, becomes the tracking mechanism for which pages need to be included in the next incremental checkpoint, and that no further data structures are necessary in order to maintain complete tracking of changed pages. Upon completing the checkpoint, and after copying _PAGE_DIRTY to _PAGE_DIRTY_COPY, the _PAGE_DIRTY bit is cleared.

Figure 14:
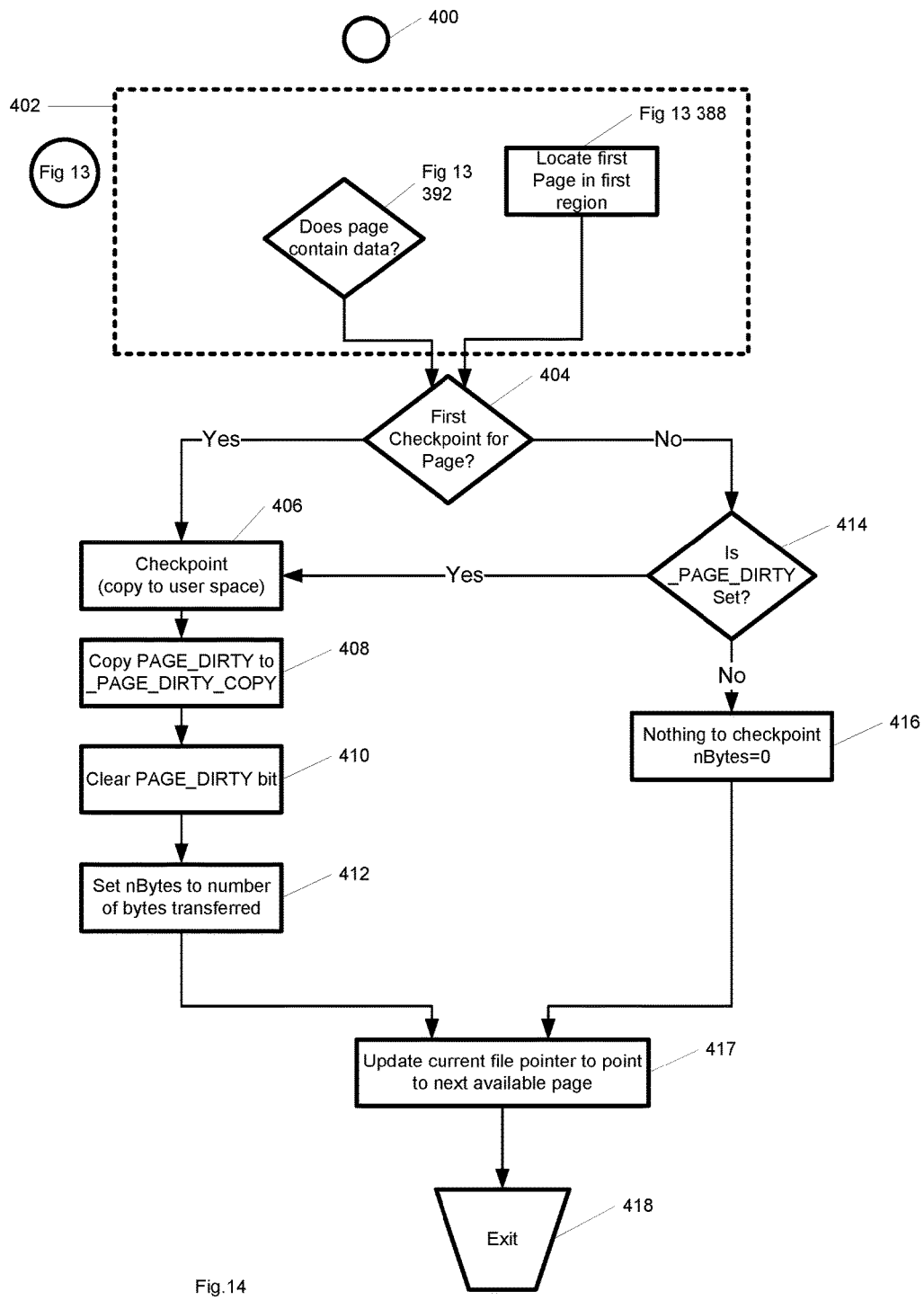
FIG. 14 is a block diagram illustrating incremental checkpointing

FIG. 14 illustrates by way of example embodiment 400 the disclosures above in further detail and their placement within the context of the earlier teachings. Referring to FIG. 13 for illustrative purposes, the core checkpointer (394, 396, 398) is activated via blocks 392 and 388. FIG. 14 includes 402 said two blocks 392 and 398 from FIG. 13 to illustrate the changes to the previous teachings. Instead of checkpointing every page, as illustrated on FIG. 13, the incremental checkpointer operates as follows:

First check 404 is to determine if this is the first checkpoint. If it is the first checkpoint, there is no prior checkpoint and thus no _PAGE_DIRTY reference available. The checkpoint checkpoints the current page 406, copies 408 the _PAGE_DIRTY bit into _PAGE_DIRTY_COPY and clears 410 the _PAGE_DIRTY bit. Finally, the nBytes is set 412 to the number of bytes transferred in copy_to_user( ) as previously disclosed. If this is the second or later checkpoint 404 the page table entry flag is checked to see if the _PAGE_DIRTY bit is set. If _PAGE_DIRTY is set, the page has been modified and needs to be checkpointed, which is accomplished with the just described set of steps 406, 408, 410 and 412. If the _PAGE_DIRTY is not set, the data on the page is unmodified and the page does not need to be checkpointed. The number of bytes, nBytes, is thus set 416 to zero. Following setting the number of bytes transferred 412, 416 the current file pointer is updated 417 to point to the start of the next page or the end of the last page, as previously disclosed. Finally, the checkpointer exits 418 as the current page has been processed.

The just-disclosed incremental checkpointing offers several improvements over Neary and Backensto: Where Neary and Backensto marked pages "read-only" and rely on a segment fault to capture changed pages; the present invention relies exclusively on the PAGE_DIRTY bit, which is automatically updated by the CPU. In Neary, by primarily addressing the incremental checkpointing from user space, each segment fault causes a transition from kernel-space to use-space to handle the error conditions. Said transition is generally expensive and slows application execution. The present invention exclusively deals with the access issue in kernel space and requires no page fault handling.

8.2 Merging Full and Incremental Checkpoints

When using incremental checkpointing, the incremental checkpoints are merged into a full checkpoint. The checkpointing process starts with one full checkpoint, i.e. a checkpoint that includes all process memory pages, and is followed by checkpoints where only the changed pages are included. A new incremental checkpoint contains only those pages that have changed since the last checkpoint, and the update to the full checkpoint proceeds as follows: every page in the incremental checkpoint is written to the full checkpoint, thereby updating the checkpoint with the most recent checkpoint data. The process of merging an incremental checkpoint into a full checkpoint is called merging throughout the disclosures of the present invention.

By way of example, if an incremental checkpoint contains page 300, the page 300 in the full checkpoint is updated. If the full checkpoint contains a page 301, and the incremental checkpoint does not contain page 301, said page 301 in the full checkpoint is left unchanged.

Upon the completion of a checkpoint merge, the full checkpoint is up-to-date with the latest incremental changes and may be used as a checkpoint for a full process restore. Incremental checkpoints on their own are incomplete, as they only contain changed pages, and therefore cannot directly be used for a process restore.

Figure 15:
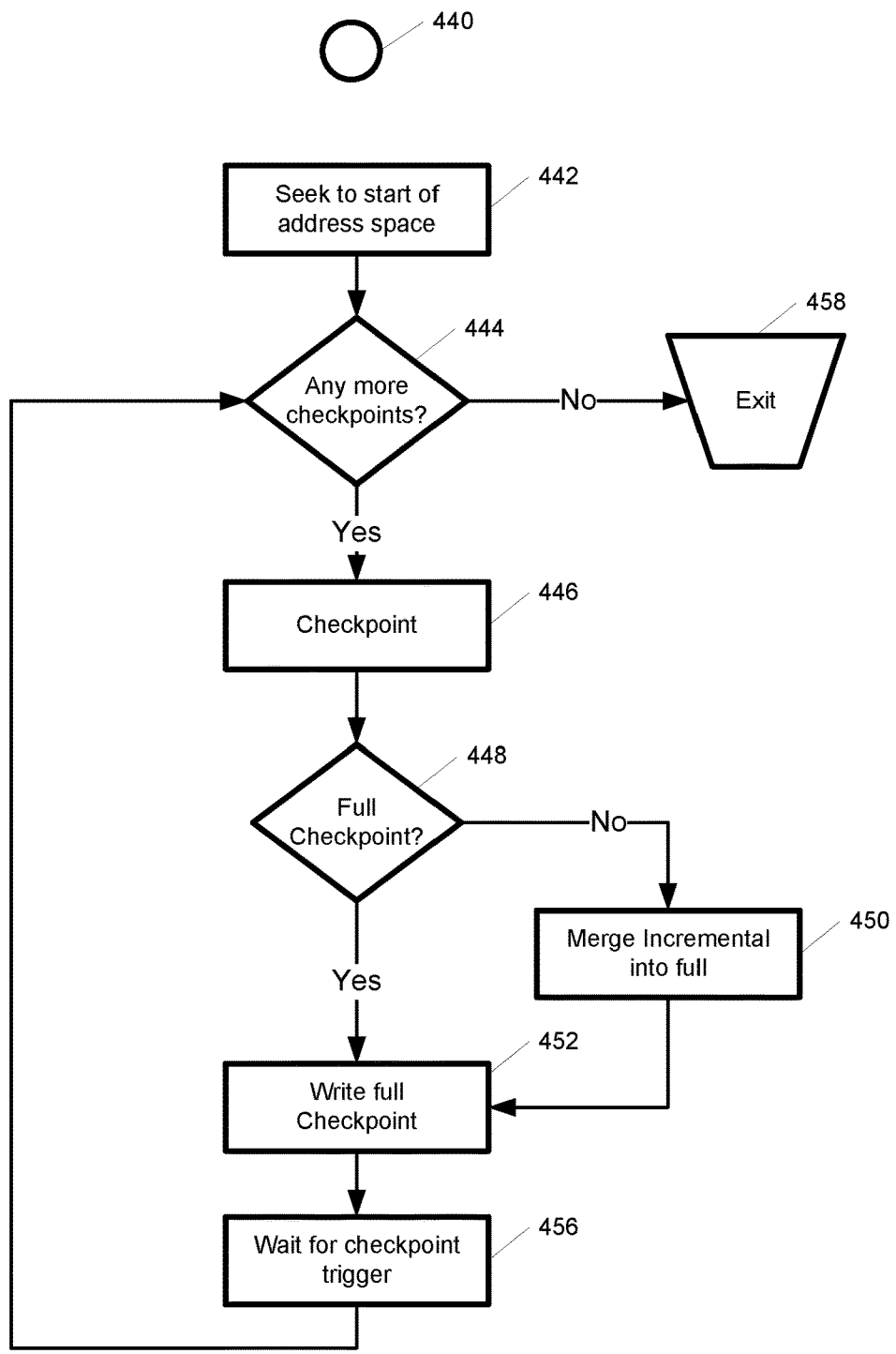
FIG. 15 is a block diagram illustrating restoring from a checkpoint

FIG. 15 illustrates by way of example embodiment 440, the control flow of the user-space side of incremental checkpointing. As disclosed above, checkpointing starts by seeking to the beginning of the address to be checkpointed 442. If there are no more data to be collected 444, checkpointing is complete 458, and the checkpointing cycle is terminated. If there is more checkpointing data to collect 446, it is first determined 448 if this is a full checkpoint or an incremental checkpoint. If it's a full checkpoint, the checkpoint is written to storage 452. If it is an incremental checkpoint, the incremental checkpoint is merged 450 into the current full checkpoint, and said full checkpoint written to storage 452. After writing the full checkpoint 452, the checkpointer waits for the next checkpoint trigger 456. When the checkpoint is triggered the cycle repeats 444. From the user-space part of checkpointing, the incremental checkpointer only requires one additional step of merging 450 incremental pages into a full checkpoint.

8.3 Storing Checkpoints and Compression

Each time an incremental checkpoint is merged into the previous checkpoint a new full checkpoint is formed. It differs from the previous checkpoint by the pages in the incremental checkpoint. Said full checkpoints are written to memory, local storage, networked store or other remote storage for potential use later. The application may be fully restored from a full checkpoint, as disclosed in the following section.

In a preferred embodiment, the checkpoints are written to memory or storage uncompressed; in an alternate preferred embodiment the checkpoints are compressed prior to being written to storage. Conversely, upon reading a compressed checkpoint during restore, the checkpoint is decompressed.

8.4 Deletion of Pages

As an application executes it allocates and de-allocates memory. As the application allocates memory it is automatically reflected in the VMAs as additional pages and is thus automatically picked up by the disclosed incremental checkpointer.

When an application de-allocates memory the operating systems and libraries remove the allocation from the application process that had allocated the memory. Depending on the size of the de-allocate memory and the memory allocator, the corresponding memory page may be de-allocated and removed from the virtual memory area. When and if memory is returned to the operating system is not predictable, and the present invention addresses the issue of de-allocating memory as follows:

As previously disclosed, the checkpointer starts by taking a full checkpoint, which contains a complete memory image and then takes one or more incremental checkpoints. After a set number of incremental checkpoints, a full checkpoint is taken again, and the cycle restarts. The full checkpoints fully account for allocated and de-allocated memory and every full checkpoint thus ensures that de-allocated memory has been properly accounted for in the checkpoint.

9. RESTORING FROM CHECKPOINT

Figure 9:
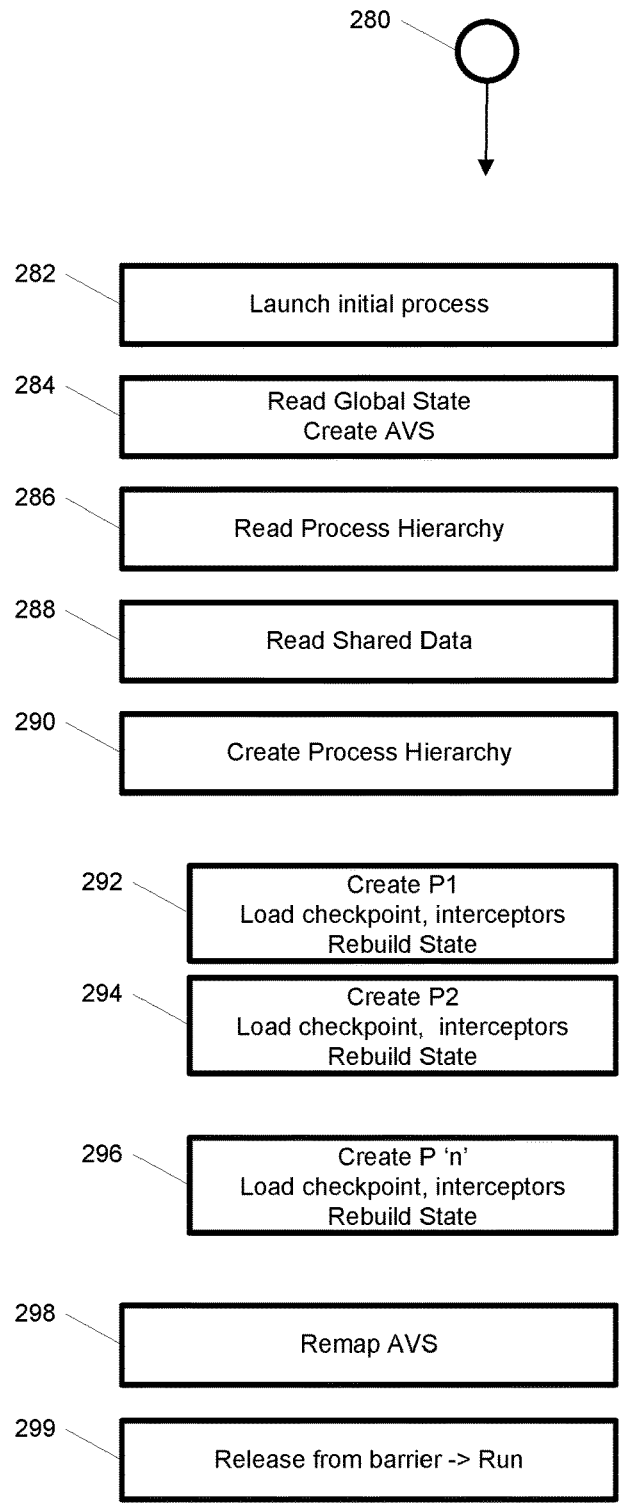
FIG. 9 is a block diagram illustrating restoring a checkpoint.

FIG. 9 illustrates by way of example embodiment 280 the general processes by which an application is restored from a checkpoint. First, the initial process 282 is created. The initial process is responsible for reading the checkpoint and creating the application processes. The initial process first reads the global checkpoint data 284 including the AVS. The AVS is required before creating any of the application processes, as the virtualization subsystem may be queried by the individual component processes. This is followed by reading the process hierarchy 286 and the data shared between application processes 288. At this point the initial process is able to recreate the individual processes that comprise 290 the application as it has loaded the process hierarchy. The individual component processes are then created, the checkpoints overlaid, interceptors installed and state rebuild. The process rebuilding is first performed for the first process in the hierarchy P1 292, followed by the second process P2 294, and eventually finishes with the last process Pn 296. When, by way of example, process P1 is created, checkpoint loaded, interceptors installed and state rebuilt, it is done within the process hierarchy 290 as provided in the checkpoint. It is obvious to anyone with ordinary skills in the art that the above disclosures naturally extends to application comprised of any number processes with any hierarchy. When all processes have been created and initialized, the resources identified within the AVS are remapped 298 to ensure that the image is correctly mapped on the new host OS. Finally, with the entire state recreated, the application is released 299 from the barrier and resumes running from the place of the checkpoint.

The restoration of individual process checkpoints are now disclosed in further detail. FIG. 8 illustrates by way of example embodiment, 240 the structure of the checkpoint. Specifically, the layout of the checkpoint for an individual processes is given in blocks 260-272. During a restoration of a checkpoint, each page in the checkpoint is read and the data written to the appropriate memory page. By way of example the data 264 from the first page in the checkpoint 262 is written to the corresponding page in application memory. The same applies for all other pages within the address space of the application. The page info block is used to update the page table and VMA page flags as appropriate. The detailed teachers of restoring VMA and PTE are given below.

As disclosed above, the kernel uses Virtual Memory Areas (VMAs) to keep track of memory. Part of restoring an application's memory image from a checkpoint therefore requires re-generation of the VMA data structures. Specifically, the vm_area_struct embedded within the mm_struct must be rebuilt to match the memory pages included within the checkpoint.

To restore from a checkpoint requires said checkpoint to be a full checkpoint, as opposed to an incremental checkpoint. Since a full checkpoint contains all memory pages for the process, rebuilding the VMA infrastructure is comprised of first deleting all VMA entries in the vm_area_struct followed by adding each page one at a time.

9.1 Restoring VMAs and PTEs.

The virtual memory areas are process private and can thus be rebuilt to match the checkpoint exactly. The page table and PTEs are part of the underlying operating system and must therefore be treated differently than process-private structures.

In the preferred embodiment, restoring a page from a checkpoint is performed as follows: First a vm_area_struct is allocated to represent the page, the page is allocated with do_mmap( ), the vm_area_struct is updated to match the just allocated page, the vm_area_struct attributes are updated with the attributes stored in the page info block in the checkpoint, and the vm_area_struct is merged into the VMA infrastructure for the process using vma_merge( ). The just-disclosed embodiment thus restores a page from the checkpoint to the same virtual address it occupied within the address space of the original process where the checkpoint originated. Associated with the page in the process' address space is the physical PTE and its associated protection and state. Using the traversal algorithm disclosed previously, the PTE is identified for each page, and said PTE is updated with the PTE attributes stored in the page info block in the checkpoint of said page.

The entire process is restored by first clearing all vm_area_structs from the mm_struct, and then restoring each page as just disclosed. The repeated restoration of every page in the checkpoint rebuilds the process' memory image to match the image at the time of the checkpoint, and by also updating the associated physical PTE, the operating system's view and the process' internal state is reconstructed to match the original process.

The kernel functions to manipulate VMAs and PTEs are well documented and will therefore not be further described herein.

9.2 Remapping AVS Entries.

Finally, after all processes have been recreated and restored, the resource information in the AVS is remapped against the new image. Resources, such as open files, have components both in user-space and in kernel-space, and must be rebuilt to be functional after a restore. By way of example, the file is re-opened from user space, which triggers a recreation of its kernel state. This last step updates the internals of the resource and makes is a functional resource on the new host operating system.

After remapping of AVS entries the application is ready to run.

10. DEPLOYMENT SCENARIOS

Figure 10:
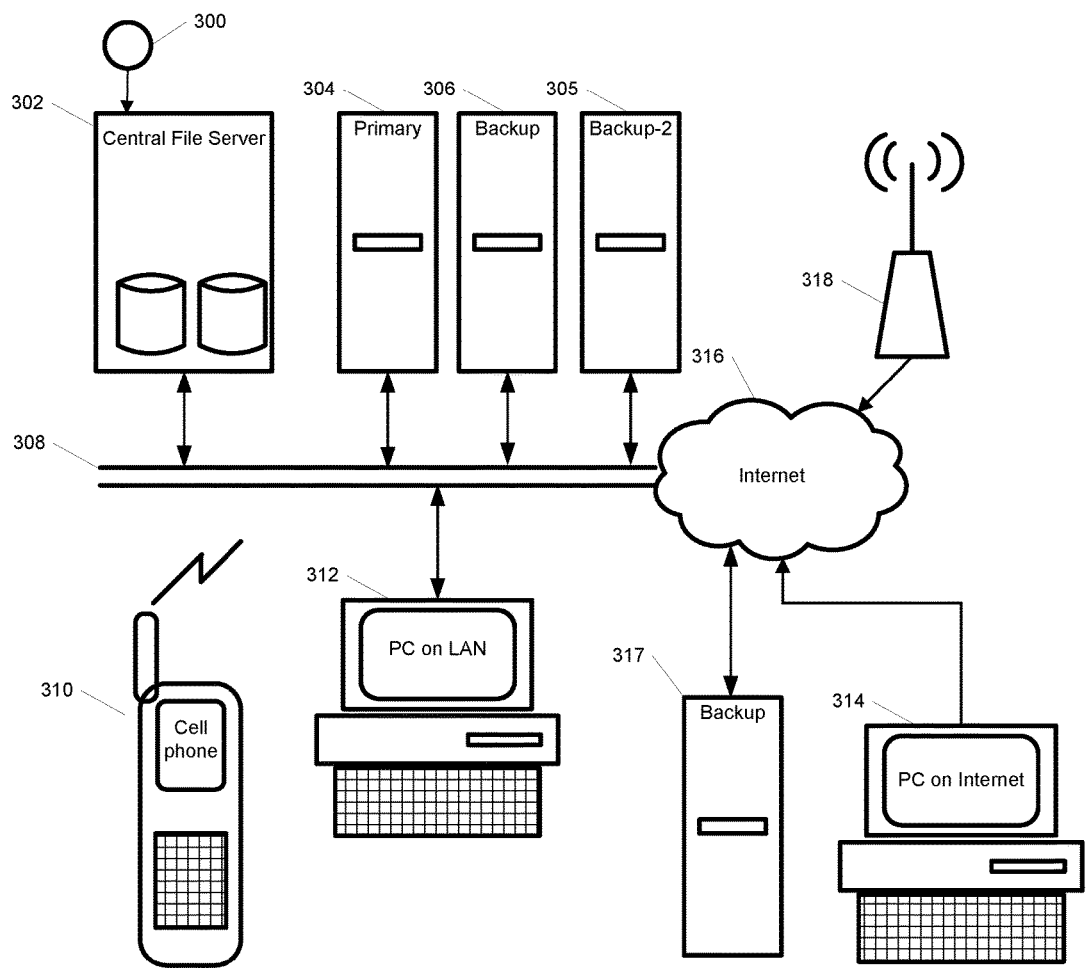
FIG. 10 is a block diagram illustrating various deployment scenarios.

FIG. 10 illustrates by way of example embodiment 300 a variety of ways the invention can be configured to operate.

In one embodiment, the invention is configured with a central file server 302, primary server 304 and backup server 306. The primary server 304 runs the primary application and the backup serves as backup. The primary 304 and backup 306 are connected to each other and the storage device 302 via a network 308. The network is connected to the internet 316 for external access. In another embodiment the primary server 304 has two backup servers; backup 306 and backup-2 305. In yet another embodiment the primary 304 runs in the data center, while the backup 317 runs off site, accessed over the internet In one embodiment a PC client 312 on the local network 308 is connected to the primary application while the backup application is prepared to take over in the event of a fault. In another embodiment a PC 314 is configured to access the primary application server 304 over the public internet 316. In a third embodiment a cell phone or PDA 310 is accessing the primary application 304 over wireless internet 316, 318. The present invention is configured to server all clients simultaneously independently of how they connect into the application server; and in all cases the backup server is prepared to take over in the event of a fault Finally, as the interceptors and kernel module are components implemented outside the application, the operating system and system libraries, the present invention provides checkpointing without requiring any modifications to the application, operating system and system libraries.

The just illustrated example embodiments should not be construed as limiting the scope of the invention but as merely providing illustrations of some of the exemplary embodiments of this invention

11. CONCLUSION

In the embodiments described herein, an example programming environment, systems and configurations were disclosed for which one or more embodiments according to the invention were taught. It should be appreciated that the present invention can be implemented by one of ordinary skill in the art using different program organizations and structures, different data structures, different configurations, different systems, and of course any desired naming conventions without departing from the teachings herein. In addition, the invention can be ported, or otherwise configured for, use across a wide-range of operating system environments.

Although the description above contains many details, these should not be construed as limiting the scope of the invention but as merely providing illustrations of some of the exemplary embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A system, comprising:
   computer system memory comprising one or more memory locations configured to store one or more multi-process applications;
   one or more Central Processing Units (CPUs) operatively connected to said computer system memory and configured to execute the one or more multi-process applications on a host with a host operating system;
   a kernel-space checkpointer configured to provide incremental kernel-space checkpointing of multi-process applications; and
   one or more user-space interceptors preloaded into the address space of each application process, wherein said user-space interceptors comprise a barrier;
   wherein said kernel-space checkpointer is called while the execution of application processes are halted at said barrier, and said kernel-space checkpointer incrementally checkpoints the processes of the one or more multi-process applications;
   wherein said incremental checkpointing is comprised of tracking dirty pages for page table entry (PTE) pages within the address space of the one or more multi-process applications;
   wherein a dirty page bit is repurposed to track dirty pages for incremental checkpointing; and
   wherein a copy of an original dirty page bit is stored in a backup bit during the incremental checkpointing.

2. The system according to claim 1 wherein said host operating system is one of Windows, Linux, Solaris, Android, MacOS, iOS, or UNIX.

3. The system according to claim 1 wherein said kernel-space checkpointer is implemented as one of a kernel module, a loadable kernel module, or kernel loadable module.

4. The system according to claim 1 wherein said kernel-space checkpointer is compiled into the kernel.

5. The system according to claim 1 wherein said kernel-space checkpointer is implemented as one of a character device or block device.

6. The system according to claim 1, comprising at least one page table configured to map between process virtual addresses and physical memory addresses.

7. The system according to claim 1, wherein said user-space interceptors comprise creation of a per-process checkpointing thread and an application virtualization space providing a private resource name space.

8. The system according to claim 1, wherein a page table entry with page dirty set is included in an incremental checkpoint, and a page table entry with page dirty bit cleared is excluded from the incremental checkpoint.

9. The system according to claim 8, wherein the page table entry dirty bit is cleared after taking an incremental checkpoint.

10. The system according to claim 1, wherein virtual memory areas (VMAs) of the one or more multi-process applications are used to identify memory pages for multi-process applications.

11. The system according to claim 10, wherein for each virtual memory page identified by said virtual memory areas, a page table is traversed and a corresponding page table entry is identified.

12. The system according to claim 10, wherein checkpoint information for each page contains virtual memory area page information and corresponding page table entry information.

13. The system according to claim 10, wherein said memory pages are identified by traversing virtual memory areas (VMAs) for each application process, and for each virtual memory area identify pages comprising each virtual memory area.

14. The system according to claim 1, further comprising a checkpointer configured to:

first taking one full checkpoint comprising memory pages in multi-process applications, and clearing all page dirty bits for said memory pages;

taking one or more incremental checkpoints, and merging said incremental checkpoints into said full checkpoint;

wherein pages included in said incremental checkpoints replace said pages in the full checkpoint, and other pages in said full checkpoint remain unmodified.

15. The system according to claim 14, wherein said merged checkpoints are written to one of memory, local storage, network storage, or remote storage.

16. The system according to claim 15, further comprising compressing-said checkpoints before writing to one of memory, local storage, network storage, or remote storage.

17. The system according to claim 14, wherein:
a full checkpoint is comprised of global state for application processes, process hierarchy, shared state, and individual process checkpoints; and
said individual process checkpoints are comprised of one or more page information blocks comprised of virtual memory areas page information and page table entry page information.

18. The system according to claim 14, wherein a page in said full checkpoint is left unmodified if said incremental checkpoints does not contain said page.

19. The system according to claim 1, wherein said incremental checkpoints are transferred from kernel-space to user-spacing using one of copy_to_user( ) or memory mapped pages.

20. A method, comprising:
executing one or more multi-process applications on a host with a host operating system;
providing kernel-space checkpointing of the multi-process applications via a kernel-space checkpointer, wherein one or more user-space interceptors are located in the address space of each application process, wherein the one or more user-space interceptors comprise a barrier;
calling the kernel-space checkpointer while the execution of application processes are halted at said barrier;
incrementally checkpointing, by the kernel-space checkpointer, the processes of the multi-process applications;
wherein said incremental checkpointing is comprised of tracking dirty pages for page table entry pages within the address space of said multi-process applications;
wherein a dirty page bit is repurposed to track dirty pages for incremental checkpointing; and
wherein a copy of an original dirty page bit is stored in a backup bit during the incremental checkpointing.

* * * * *